(12) United States Patent
Xu

(10) Patent No.: US 7,882,163 B2
(45) Date of Patent: Feb. 1, 2011

(54) ELECTRONIC ABACUS AND OPERATION METHOD OF THE ELECTRONIC ABACUS

(76) Inventor: Fawang Xu, Room E-401, Zhongchengkangqiao Garden, Danzhutou, Buji Town, Shenzhen, Guangdong Province, 518114 (CN)

( * ) Notice: Subject to any disclaimer, the term of this patent is extended or adjusted under 35 U.S.C. 154(b) by 890 days.

(21) Appl. No.: 11/576,866

(22) PCT Filed: Sep. 30, 2005

(86) PCT No.: PCT/CN2005/001624

§ 371 (c)(1),
(2), (4) Date: Apr. 6, 2007

(87) PCT Pub. No.: WO2006/037272

PCT Pub. Date: Apr. 13, 2006

(65) Prior Publication Data

US 2008/0189344 A1    Aug. 7, 2008

(30) Foreign Application Priority Data

Oct. 8, 2004    (CN) .................. 2004 1 0040825

(51) Int. Cl.
G06F 15/02    (2006.01)
(52) U.S. Cl. ..................................... 708/131
(58) Field of Classification Search .......... 708/131–146
See application file for complete search history.

(56) References Cited

U.S. PATENT DOCUMENTS 2,991,008 A * 7/1961 Goldberg ................. 235/145 R
5,134,692 A * 7/1992 Hiromori ...................... 708/141
6,712,614 B1   3/2004 Henderson

FOREIGN PATENT DOCUMENTS

CN    1148213    4/1997
CN    1223401    7/1999

OTHER PUBLICATIONS

International Search Report; PCT/CN2005/001624; Jan. 19, 2006; Ning Wang.

* cited by examiner

*Primary Examiner*—Tan V Mai
(74) *Attorney, Agent, or Firm*—Hamre, Schumann, Mueller & Larson, P.C.

(57) ABSTRACT

An electronic abacus includes a calculating apparatus, an input apparatus and a display apparatus. The input apparatus and the display apparatus are connected to the calculating apparatus respectively. The calculating apparatus receives the input information from the input apparatus, processes the information, and displays the processed information on the display apparatus. The input apparatus includes function keys and number input keys The number input keys include several sets of numeral keys. Each set of the numeral keys is corresponding to one digit of the input information displayed in the display apparatus. Each set of the numeral key includes the keys indicating "5", "−5", "4", "−4", "3", "−3", "2", "−2", "1", "−1" respectively.

15 Claims, 28 Drawing Sheets

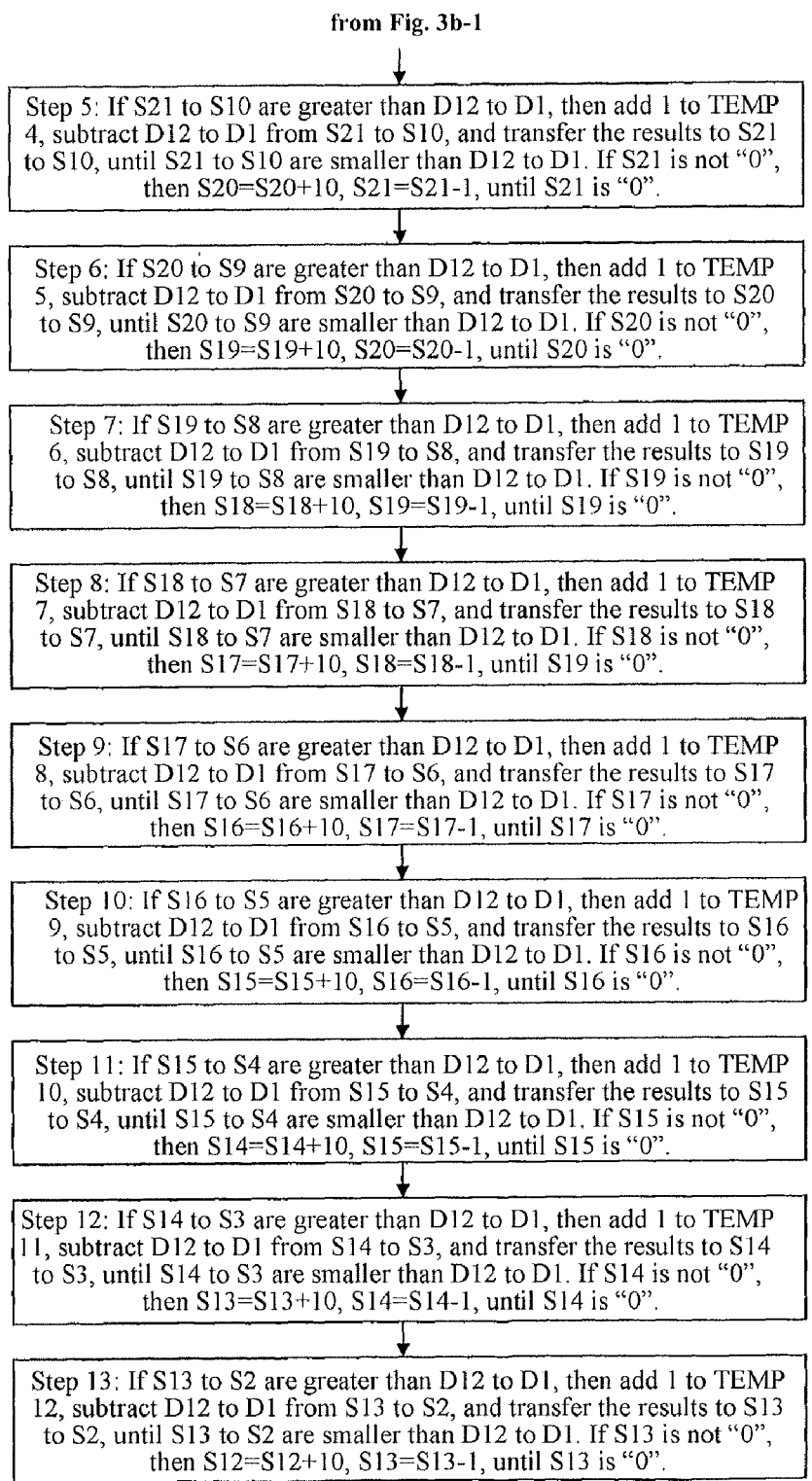

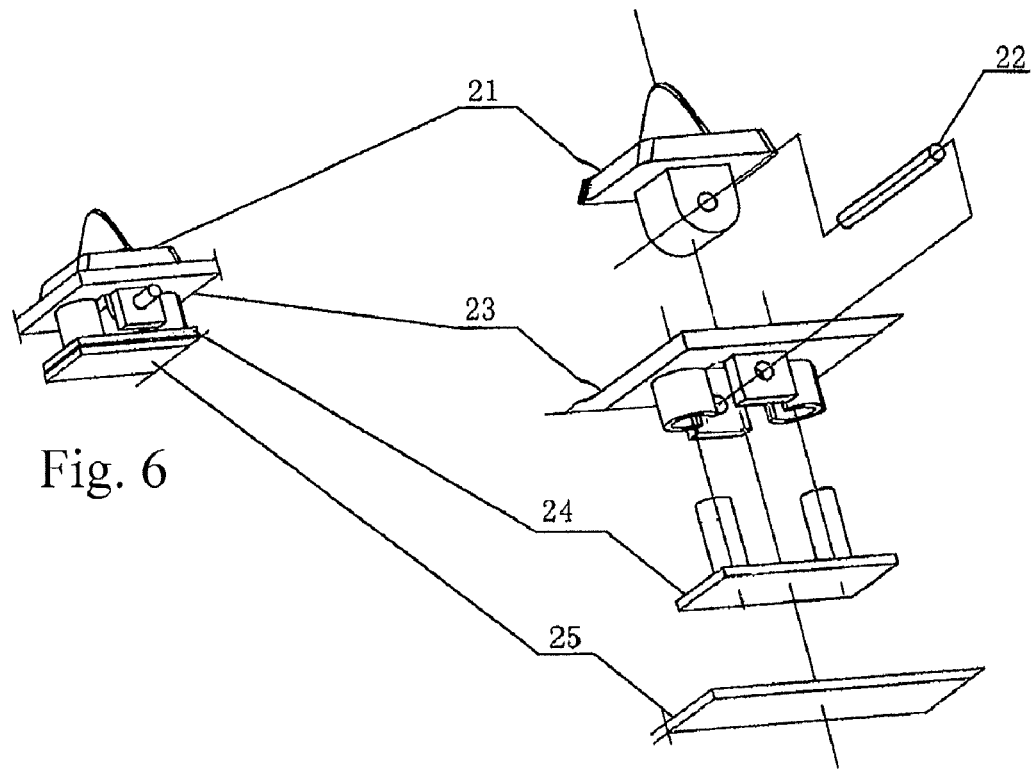
Fig. 6
Fig. 6a
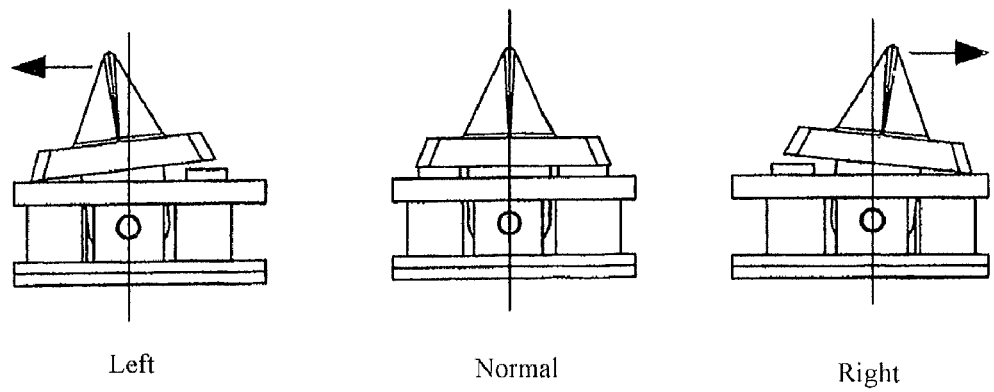
Left
Fig. 6b
Normal
Fig. 6c
Right
Fig. 6d

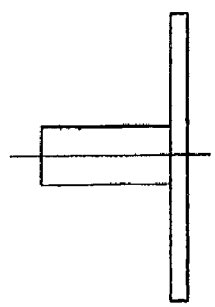
Fig. 9a
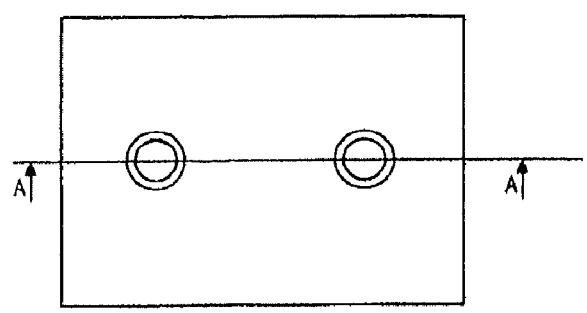
Fig. 9b
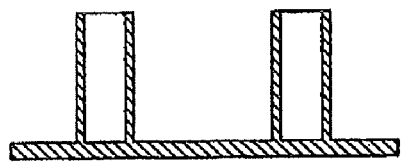
Fig. 9c
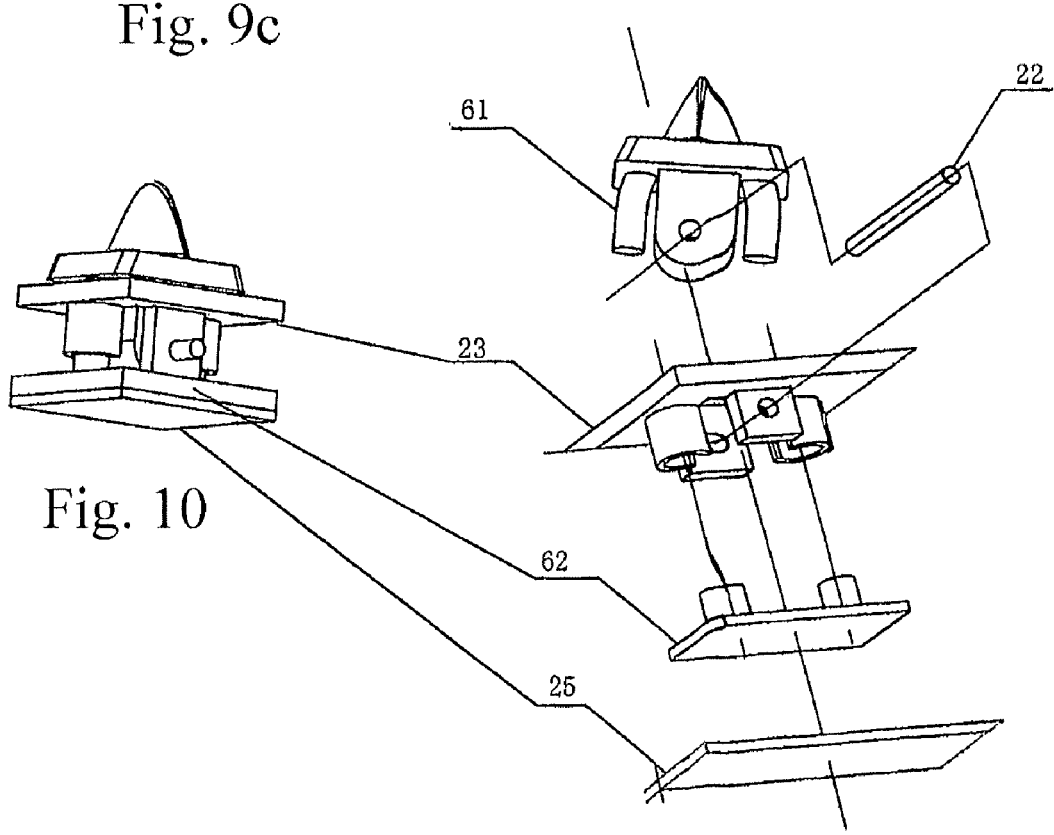
Fig. 10
Fig. 10a

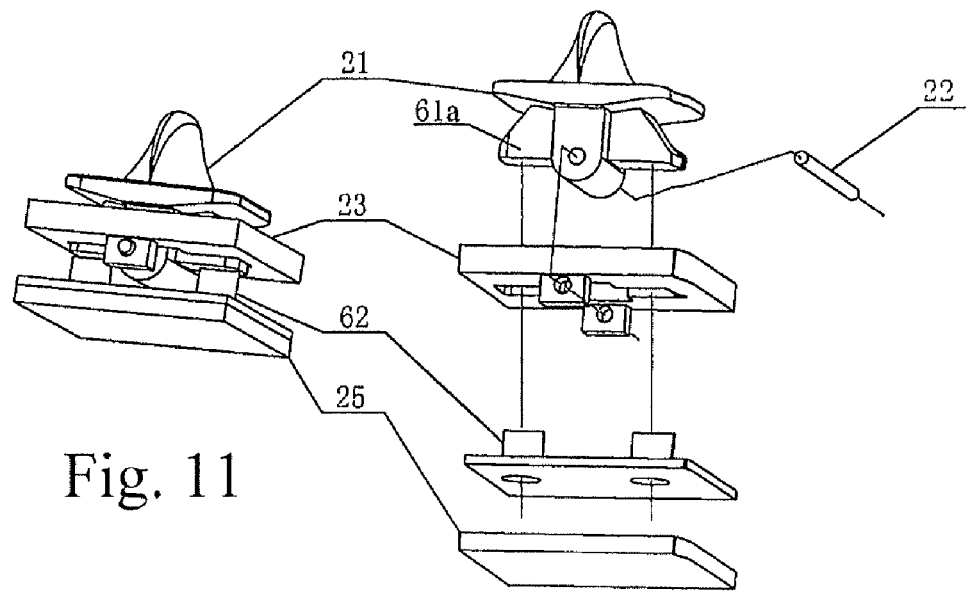
Fig. 11
Fig. 11a
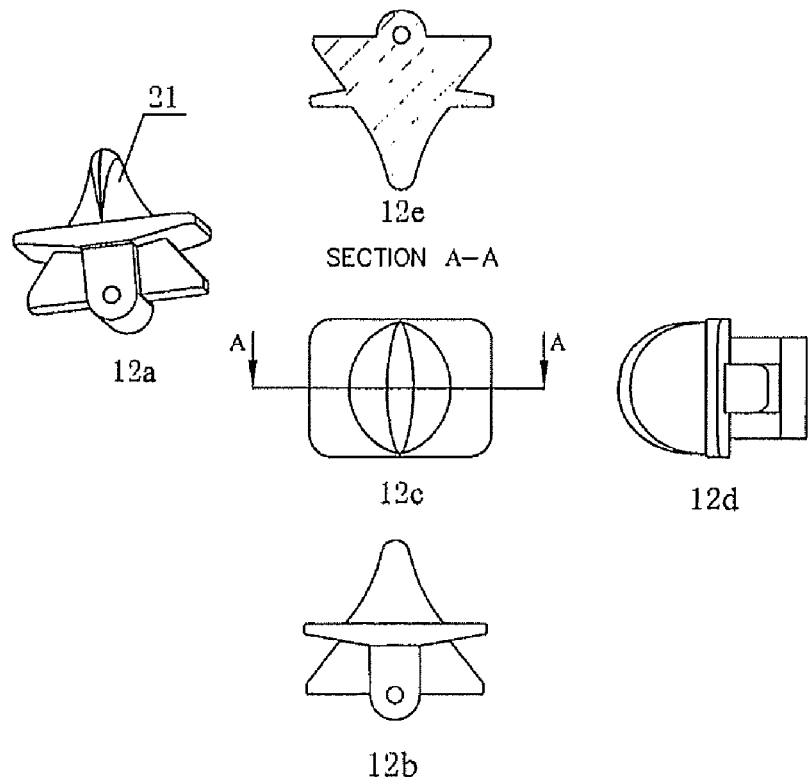
Fig. 12

ELECTRONIC ABACUS AND OPERATION METHOD OF THE ELECTRONIC ABACUS

CROSS-REFERENCE TO RELATED APPLICATIONS

This application is a national phase application under 35 U.S.C. §371 of PCT International Application No. PCT/CN/2005/001624, filed Sep. 30, 2005, which claims priority to Chinese Application Serial No. 200410040825.2, filed Oct. 8, 2004.

BACKGROUND OF THE INVENTION

1. Field of the Invention

The present invention relates to an electronic calculating device and an operation method of the electronic calculating device. More particularly, the present invention relates to an electronic abacus calculator and an operation method thereof.

2. Description of Related Art

Currently, calculating tools including abaci, calculators, and computers are used in numerical calculation. China Patent No. 01210572.4 discloses an "Electronic Abacus Calculator", which includes a case, "+", "−", "C", and "=" keys placed on the right side of the case, "×" "÷" keys, a "♪" beeping key, and an ON/OFF key placed on the left side of the case, five numeral keys placed at the central portion of the case, an LCD display at a top left portion, and a solar battery at a top right portion. The numeral keys indicates "5", "1", "2", "3", and "4" sequentially, and "Decimal Fraction", "Ones", "Thousands", and "Millions" are marked on the "1" key to indicate the decimal fractions and integral digits. The function keys, the numeral keys, and the display are integrated with an integrated circuit. The conventional "electronic abacus calculator" has the following disadvantages. (1) In the subtraction operation, both the "−" and "=" keys must be engaged, so more operation steps are required. (2) The decimal digits are fixed, and cannot be floated. (3) The continuous four fundamental mixed operations of addition, subtraction, multiplication, and division cannot be carried out. (4) The result of the calculation cannot be temporarily memorized. And (5) decimal digits displayed in the result of calculation cannot be controlled or selected.

SUMMARY OF THE INVENTION

The present invention is directed to an electronic abacus that solves the problem of excessive operations since a "−" key must be used in a subtraction operation.

To achieve the aforementioned objective, the present invention provides an electronic abacus, which includes an calculating apparatus, an input apparatus, and a display apparatus. The input apparatus and the display apparatus are connected with the calculating apparatus. The calculating apparatus receives input information from the input apparatus, processes the input information, and displays the processed information on the display apparatus. The input apparatus includes function keys and number input keys. The number input keys include a plurality of sets of numeral keys, and each set of the numeral keys is corresponding to one digit of the inputting numeral digit. Each set of the numeral keys includes keys indicating "5", "−5", "4", "−4", "3", "−3", "2", "−2", "1", and "−1", respectively.

To achieve the aforementioned objective, the present invention also provides an operation method of the electronic abacus, which includes the following steps. The calculating apparatus receives input values and operators to perform corresponding operation processes. The display apparatus receives a control signal from the calculating apparatus, and displays processed information. The calculating apparatus respectively receives a value of one digit one time in an operating value. The value is a positive or negative quinary value, or a value obtained by addition or subtraction of positive or negative quinary numbers, or a value iterative derived from iterative operation of positive or negative quinary values.

According to the above embodiments, negative values are directly input by applying the numeral keys, and an addition operation can be performed without pressing the "−" key, so that the operation process is simplified.

When inputting data, the addition or subtraction operation is performed automatically without applying the "−" and "=" keys. The addition operation of a negative number and a positive number is equivalent to a subtraction operation. At this time, it is not required to shift operation of addition or subtraction in a mixed operations, so the operation process is simplified, and the operation becomes faster.

As one key is used to control the input of two type of data, negative and positive numbers, quantity of the numeral keys is reduced, thereby it is for more convenience of users.

In present invention, as two sets of data including an input line and a calculation result line are adopted, the "−" and "+" function keys are not used in the addition and subtraction operations, and the continuous mixed operation of addition, subtraction, multiplication, and division can be performed freely. Thus, the present invention combines the advantage of rapid addition and subtraction operations with mental calculation of current ordinary abaci and the advantage of rapid multiplication and division operations of calculators.

As a decimal digit control key and/or a decimal point left/right floating key are adopted, the decimal digit can be floated freely, and number of decimal digits displayed in the calculation result line can be controlled.

The input display line and the calculation result display line are displayed separately. The input display line displays intermediate operating data or input data in real time, and the calculation result display line displays data during the calculation process. Thus, the operation process is visualized for the convenience of a user.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 6 is an isometric view of a number input key (not operated) of the present invention;

FIG. 6a is an exploded view of the number input key of the present invention;

FIG. 6b is an isometric view of the number input key in an up-move state of the present invention;

FIG. 6c is an isometric view of the number input key in a normal state of the present invention;

FIG. 6d is an isometric view of the number input key in a down-move of the present invention;

FIG. 9a is a left view of a conductive rubber button of the number input key of the present invention;

FIG. 9b is a main view of the conductive rubber button of the number input key of the present invention;

FIG. 9c is a cross-sectional view of the conductive rubber button taken along the line 9c-9c of FIG. 9b of the number input key of the present invention;

FIG. 10 is an isometric view of the second embodiment of the number input key (not operated) of the present invention;

FIG. 10a is an exploded view of the second embodiment of the number input key of the present invention;

FIG. 11 is an isometric view of the third embodiment of the number input key of the present invention;

FIG. 11a is an exploded isometric view of the third embodiment of the number input key of the present invention;

FIG. 12a is an isometric view of a key according to the third embodiment of the number input key of the present invention;

FIG. 12b is a main view of a key according to the third embodiment of the number input key of the present invention;

FIG. 12c is a plan view of a key according to the third embodiment of the number input key of the present invention;

FIG. 12d is a left view of a key according to the third embodiment of the number input key of the present invention; and FIG. 12e is a cross-sectional view of a key taken along the line 12e-12e of FIG. 12c in the third embodiment of the number input key of the present invention.

DESCRIPTION OF EMBODIMENTS

The present invention will be further illustrated in detail with reference to the embodiments and the accompanying drawings.

The First Embodiment

An electronic abacus includes a calculating apparatus, an input apparatus, and a display device. The input apparatus and the display apparatus are connected with the calculating apparatus, and the calculating apparatus receives input information from the input apparatus, and processes the input information. The processing includes inputting and storing values, four fundamental mixed operations of addition, subtraction, multiplication, and division, or other mathematical operations. Processed information is displayed on the display apparatus. The processed information includes input data, operators for mathematics operation, process data, intermediate operating data, and other information which are to be displayed. The display apparatus can be a single chip microprocessor. The input apparatus includes function keys and number input keys. The number input keys include a plurality of sets of numeral keys, and each set of the numeral keys is corresponding to one digit of input information displayed in the display apparatus. Each set of the numeral keys includes keys indicating "5", "–5", "4", "–4", "3", "–3", "2", "–2", "1", and "–1", respectively. The function keys include an ON/Clear ("ON/C") key, a multiplication key ("×" key), a division key ("÷" key), an equal key ("=" key), operation result memory keys, a memory sum key, a memory clear key, a decimal digit control key, and a decimal point left/right floating key. The operation result memory keys include a first memory key and a second memory key. The display apparatus includes an input display line and a calculation result display line, wherein the input display line displays intermediate operating data or input data, and the calculation result display line displays processed data of the operation. The decimal digit control key controls the decimal digit of the data displayed in the calculation result line, and the decimal point left/right floating key moves position of the decimal point in the data of input display line. The following is the detailed function description of the calculating apparatus in accordance with the present invention, according to the keys distribution when the keys are operated and the calculating apparatus receiving corresponding input information from the keys.

Figure 1:
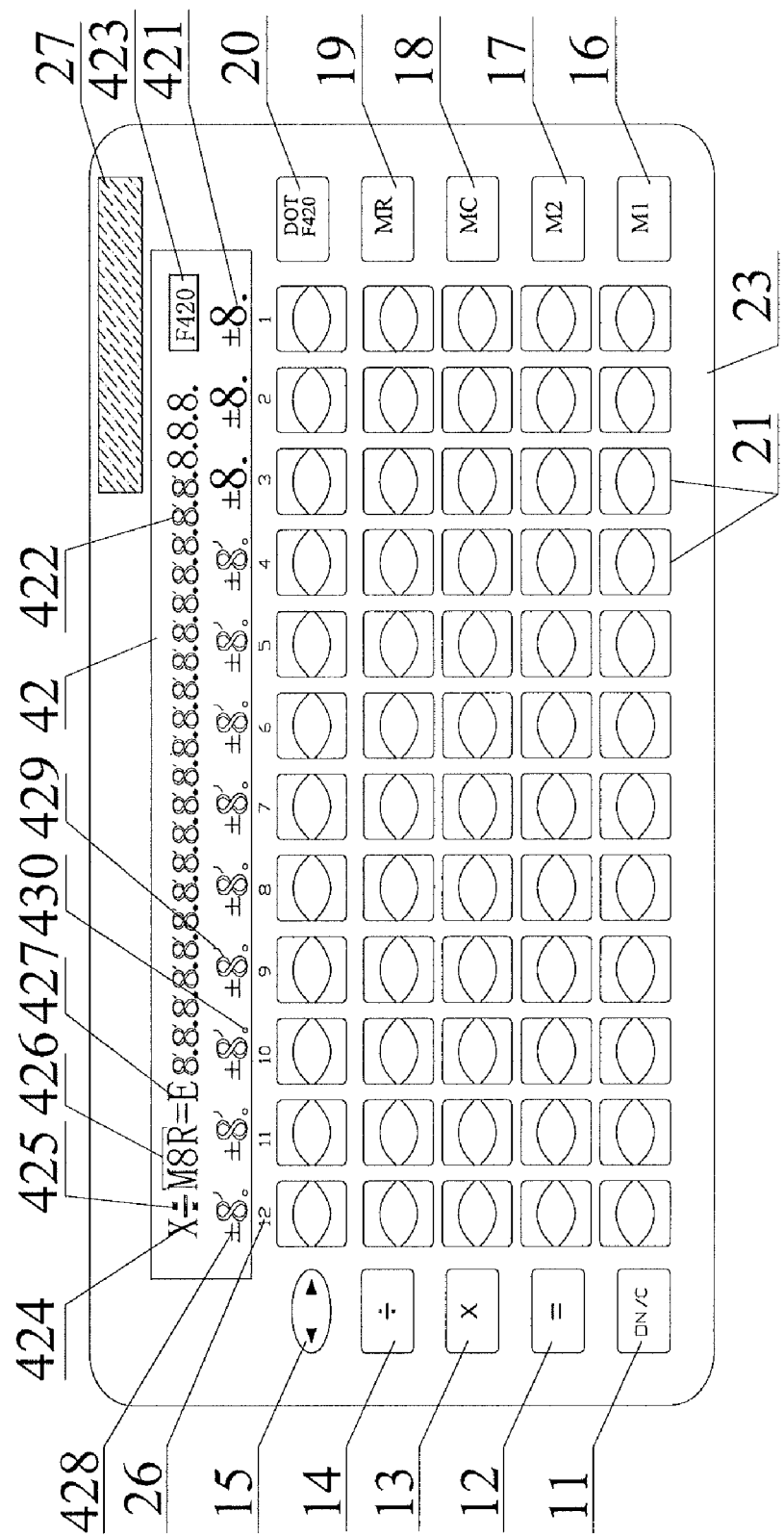
FIG. 1 is a schematic view of a operating panel of the present invention.

FIG. 1 is a schematic view of an operating panel of the present invention. As shown in FIG. 1, the function keys placed on the left of a case 23 include an "ON/C" key 11, a "=" key 12, a "×" key 13, a "÷" key 14, and a decimal point left/right floating key ("◄►" key) 15. The function keys placed on the right of the case 23 include operation result memory keys with a first memory key ("M1" key) 16 and a second memory key ("M2") key 17, a memory clear key ("MC" key) 18, a memory sum key ("MR" key) 19, a calculation result decimal digit control key ("DOT F420" key) 20. The LCD display 42 is placed in the upper portion of the case 23, and is separated into two lines. The lower line is an input display line 421 (12 digits of "±8.'"), which includes a data display digit, a "±" sign display digit beside each digit of data, a 'Thousands' separator display digit, and a decimal point display digit. The upper line is a calculation result display line 422 (24 digits), which includes a data display digit, a calculation result overflow or error display digit, a memory state display digit, a "×" sign display digit, a "÷" sign display digit, an "=" sign display digit, a calculation result decimal point selection display digit ("F/4/2/0" display digit), a 'Thousands' separator display digit beside each data, and a decimal digit display digit. Those display digits are respectively for displaying data, error ("E") sign 427, memory sign 426, "×" sign 424, "÷" sign 425, and "−" sign.

The solar battery 27 is placed in the upper portion of the case, and sixty number input keys 21 in 5 rows and 12 columns (i.e. 12 digits) are placed in the central portion of the case 23. Each of the input keys is used for inputting two numbers, i.e., each column includes five number input keys of "−5, 5", "1, −1", "2, −2", "3, −3", and "4, −4" or five number input keys of "−5, 5", "1, −4", "2, −3", "3, −2", and "4, −1" downwardly or upwardly in order. For each column of the number input keys from top to bottom or from bottom to top, "−5", "1", "2", "3", and "4" are inputted when moved up or down, and "5", "−1", "−2", "−3", and "−4" are inputted when moved down or up, or "−5", "1", "2", "3", and "4" are inputted when moved up or down, and "5", "−4", "−3", "−2", and "−1" are inputted when moved down or up. When input "6", "7", "8" or "9" in each digit by using numeral keys, two keys must be used, i.e., two keys ("5", "1" (=6), "5", "2" (=7), "5", "3" (=8), and "5", "4" (=9)) in a same column must be used to input the number. The input of the numbers −6, −7, −8, and −9 are in the similar way. The 12 columns or 12 digits of number input keys are corresponding to the 12-digit input display line 421 in the LCD display 42, and column number marks ("12 11 10 9 8 7 6 5 4 3 2 1" marks) 26 are arranged between the LCD display 42 and the number input keys 21 to indicate the column numbers for the convenience of the input correspondence.

FIGS. 6 and 6*a* are isometric views of a number input key of the present invention. As shown in FIGS. 6 and 6*a*, the numeral key includes a key 21, shift buttons, and a conductive contact. The shift buttons include a first shift button and a second shift button. The key is a bidirectional shift key, including a head, a first pressing portion, a second pressing portion, and a shift guide device. The shift guide device confines moving directions of the first pressing portion and the second pressing portion respectively, such that the first pressing portion and the second pressing portion presses the first shift button and the second shift button, and the first and the second shift buttons conduct the conductive contact, so as to input data. The first pressing portion and the second pressing portion are connected to form a pressing plate. The shift guide device includes a metal spindle 22 and a rotator. The rotator is fixed on the pressing plate, and the metal spindle 22 passes through a spindle hole in the rotator, and passes through a hole in the operating panel to be supported on the operating panel of the input apparatus. In the present invention, the first and the second shift buttons are first and second conductive rubber buttons 24. Cylindrical guide holes are defined on the bottom of the operating panel 23, and the first and the second conductive rubber buttons include two pillars. The two pillars pass through the cylindrical guide holes, and are in contact with two sides of the pressing plate. One end of the first and the second conductive rubber buttons is supported on the surface of the first pressing portion and the second pressing portion respectively, and the other end of the first and the second conductive rubber buttons is supported on the conductive contact of a PCB circuit board 25. The first and the second conductive rubber buttons 24 are closely attached on the conductive contact. As shown in FIGS. 6*b* and 6*d*, when the number input key 21 is moved, i.e., the head is moved upward or downward, input data is created by pressing down and contact the first or the second conductive rubber button.

The number input keys can adopt other structures. As shown in FIGS. 10 and 10*a*, the first pressing portions and the second pressing portions of this embodiment are different from those in the above embodiment in the first pressing portion and the second pressing portion. The first pressing portion and the second pressing portion include an arc-shaped pressing lever 61, respectively. The arc-shaped pressing levers 61 are pressed on third and fourth conductive rubber buttons 62. In addition, the bidirectional shift key can be moved in transverse or longitudinal direction, for example, electrodes are disposed on left and right sides or on upper and lower sides near the bidirectional shift key, the same key can be moved to contact the two sides, thereby generating different trigger signals. Certainly, the bidirectional shift key can adopt a dual-slot design to be pressed up and down. For example, when the same key is pressed and shifted to a different vertical distances, different key signals will be generated through photoelectric sensing or electrode contact. Moreover, the keys can also be in a double clicked or single clicked fashion, i.e., when the time between two clicks is less than a predetermined value, a double click signal is generated, and thus different key signals are formed.

Further, the shift button can be omitted, or the first pressing portion and the second pressing portion both have the shift button, and the first pressing portion directly contacts the conductive contact to turn on or turn off the conductive contact. In other words, the number input keys include the key 21 and the conductive contact, and the key is a bidirectional shift key, which includes a first pressing portion, a second pressing portion, and a shift guide device. The shift guide device confines moving directions of the first pressing portion and the second pressing portion respectively, and the first pressing portion or the second pressing portion turns on or off the conductive contact to input data. In addition to mechanical switches, other switches, such as photoelectric switches, can also be used.

The number input keys can also adopt other structures. As shown in FIG. 11, the first pressing portions and the second pressing portions of this embodiment and the above embodiment are different. The first pressing portion and the second pressing portion are trapezoid blocks 61*a* symmetrically placed on two sides of the rotator. Through holes for keys are defined in the operating panel 23. The rotator, the first pressing portion, and the second pressing portion of a key pass through one of the through holes, and the first pressing portion and the second pressing portion are in contact with or isolated from the third and fourth conductive buttons 62.

The first pressing portion and the second pressing portion can be designed asymmetrically for the comfort in use, i.e., the angle deviations of the spindle in two rotation directions are different, and the corresponding first pressing portion and second pressing portion can have different shapes and positions.

Figure 2:
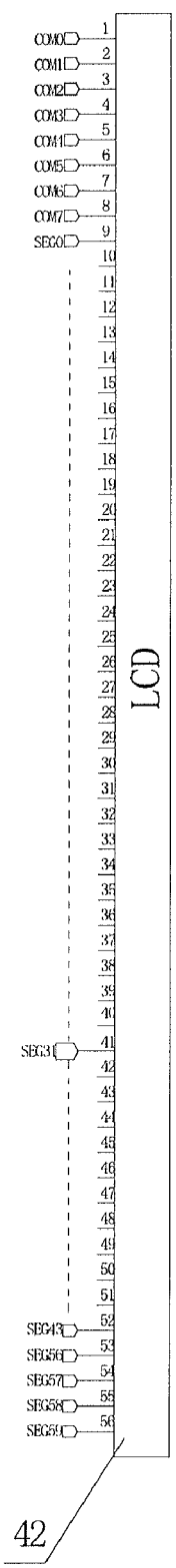
FIG. 2 is a diagram showing the principle of an LCD control circuit of the present invention.
Figures 1, 3:
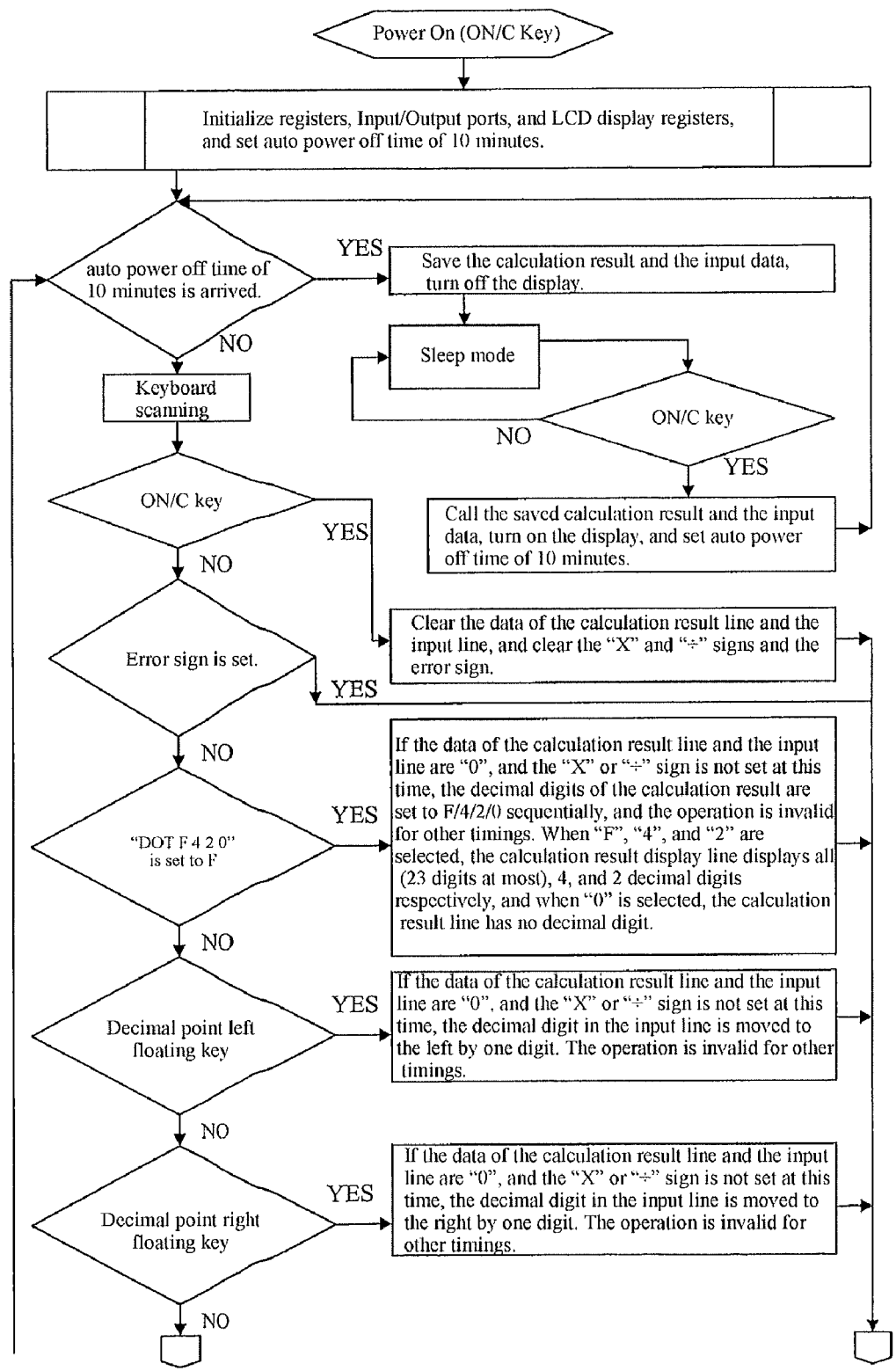
FIG. 3 (sheets -1 through -4) is a flow chart of main processes of the software of the present invention.
Figures 2, 3:
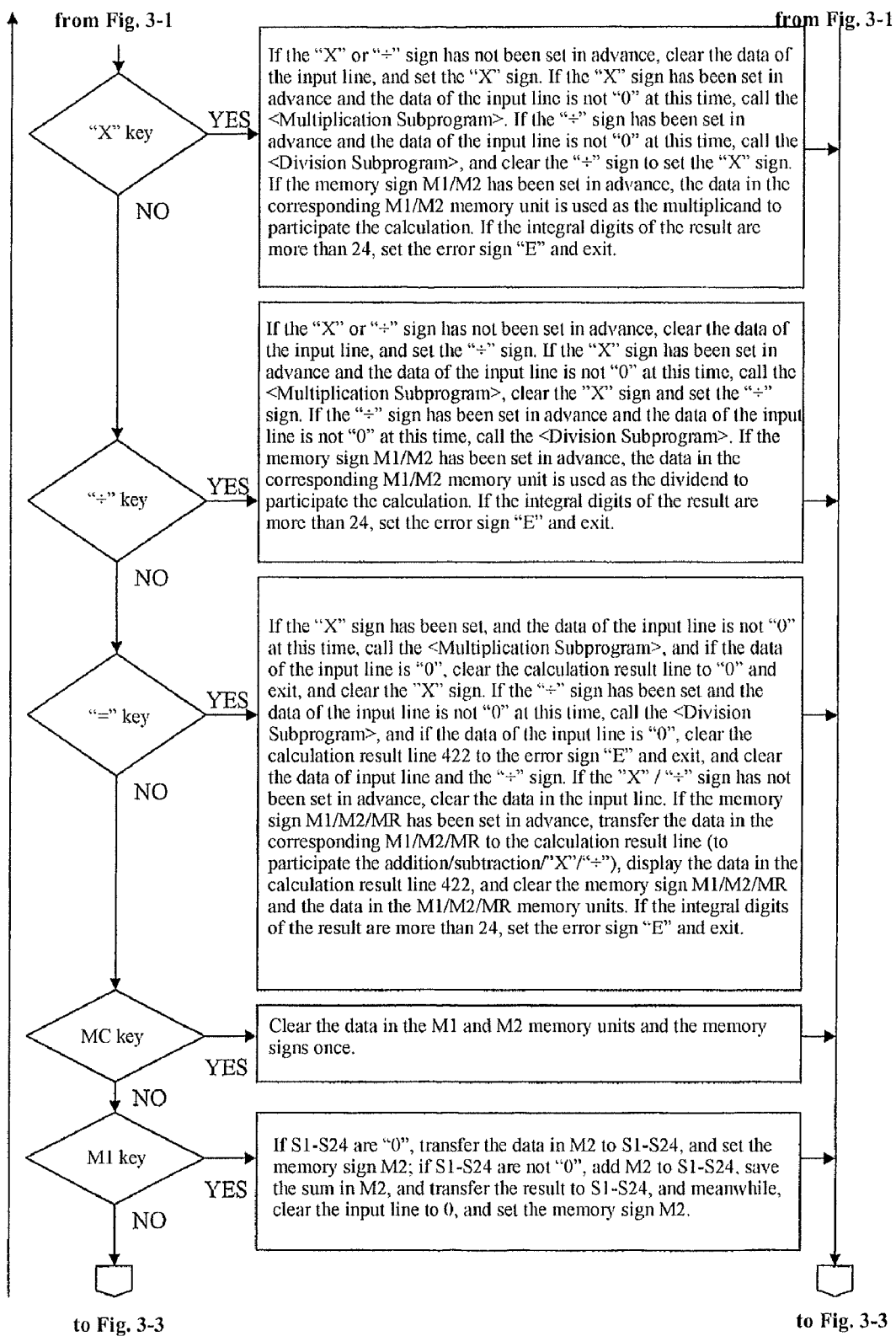
Figure 3:
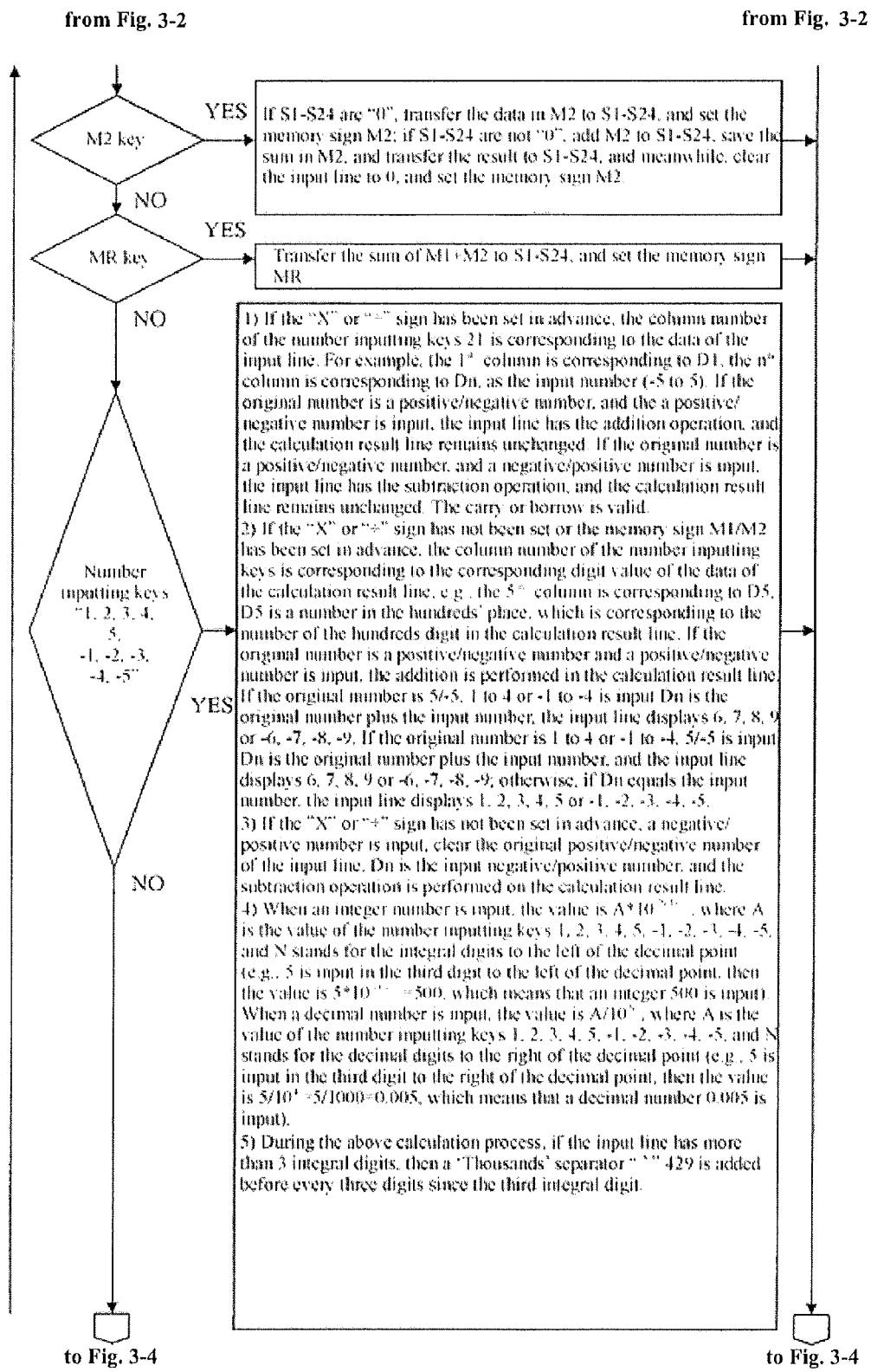
Figures 3, 4:
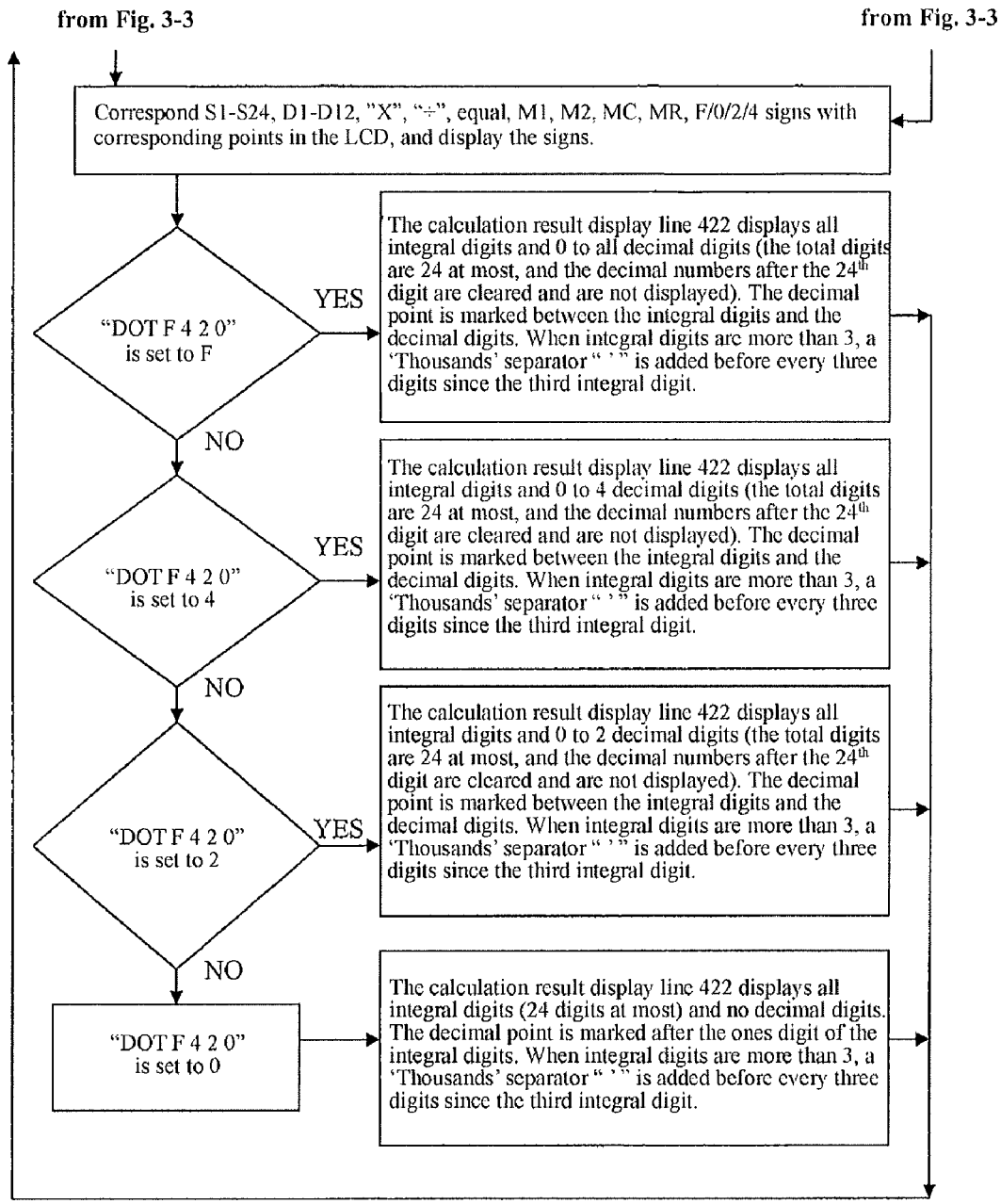
FIG. 4 is a diagram showing the principle of a control circuit of a single chip microcomputer of the present invention.
Figures 1, 3A:
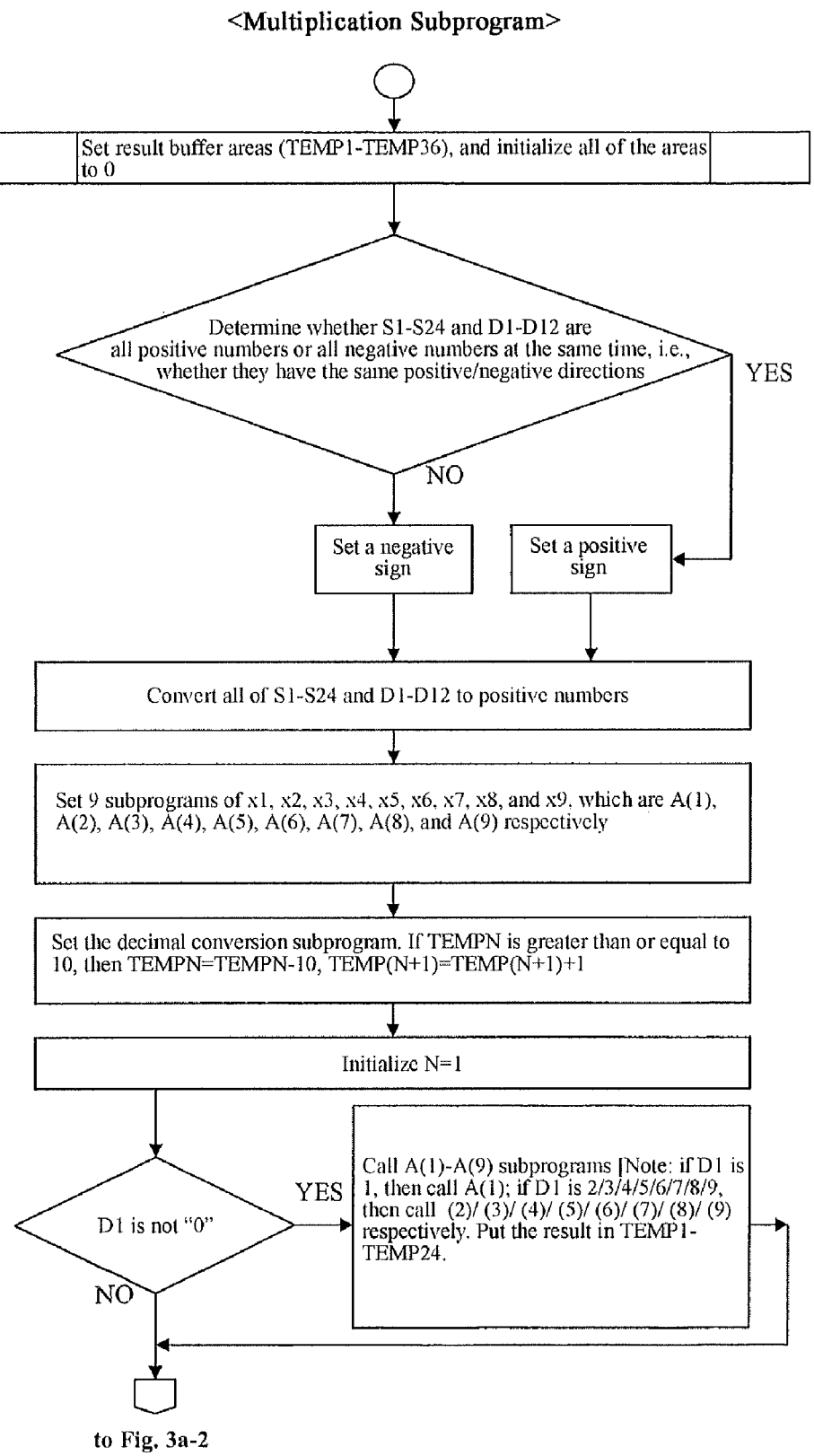
FIG. 3a (sheets -1 through -5) is a flow chart of a multiplication subprogram of the present invention.
Figures 2, 3A:
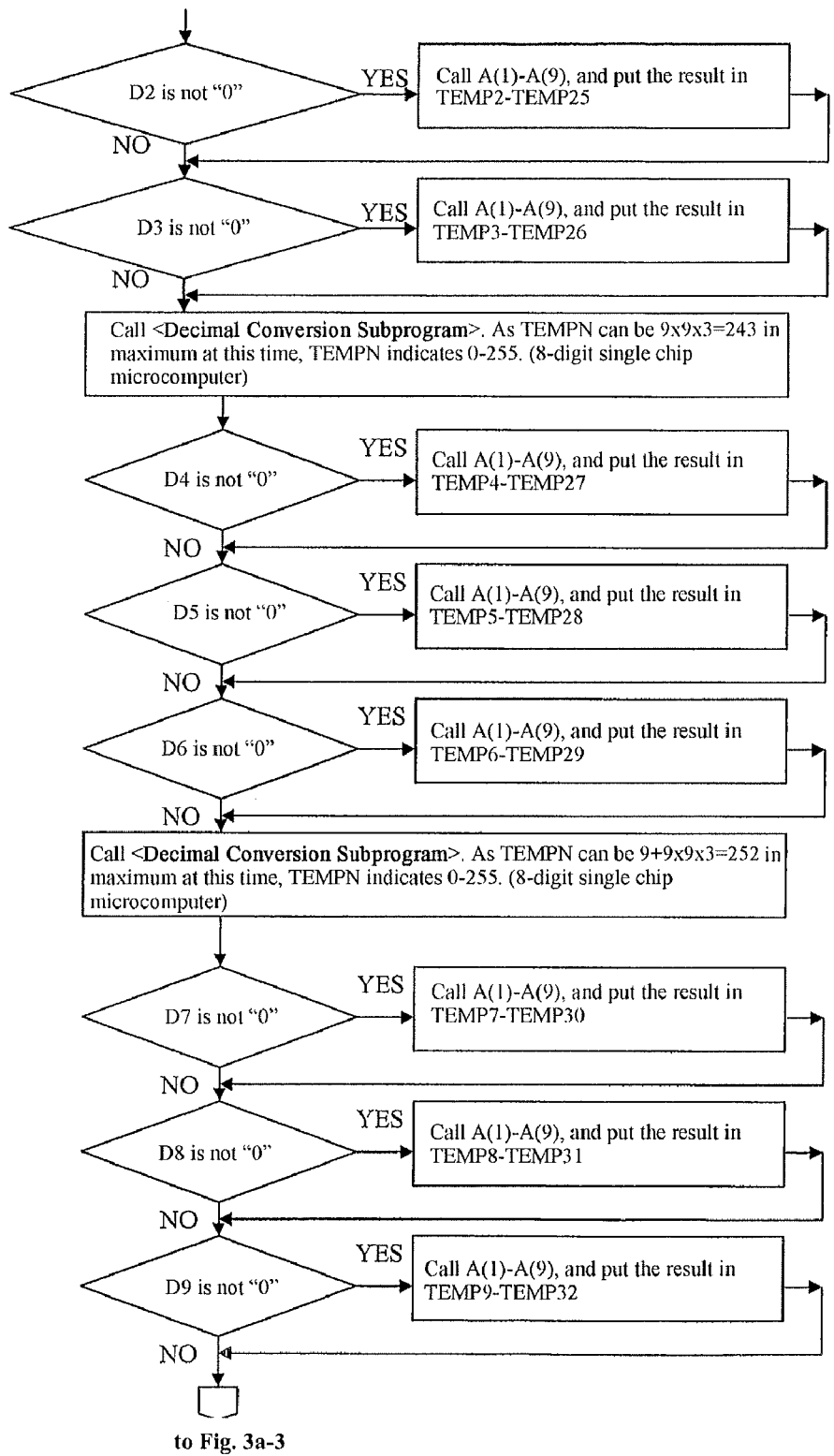
Figures 3, 3A:
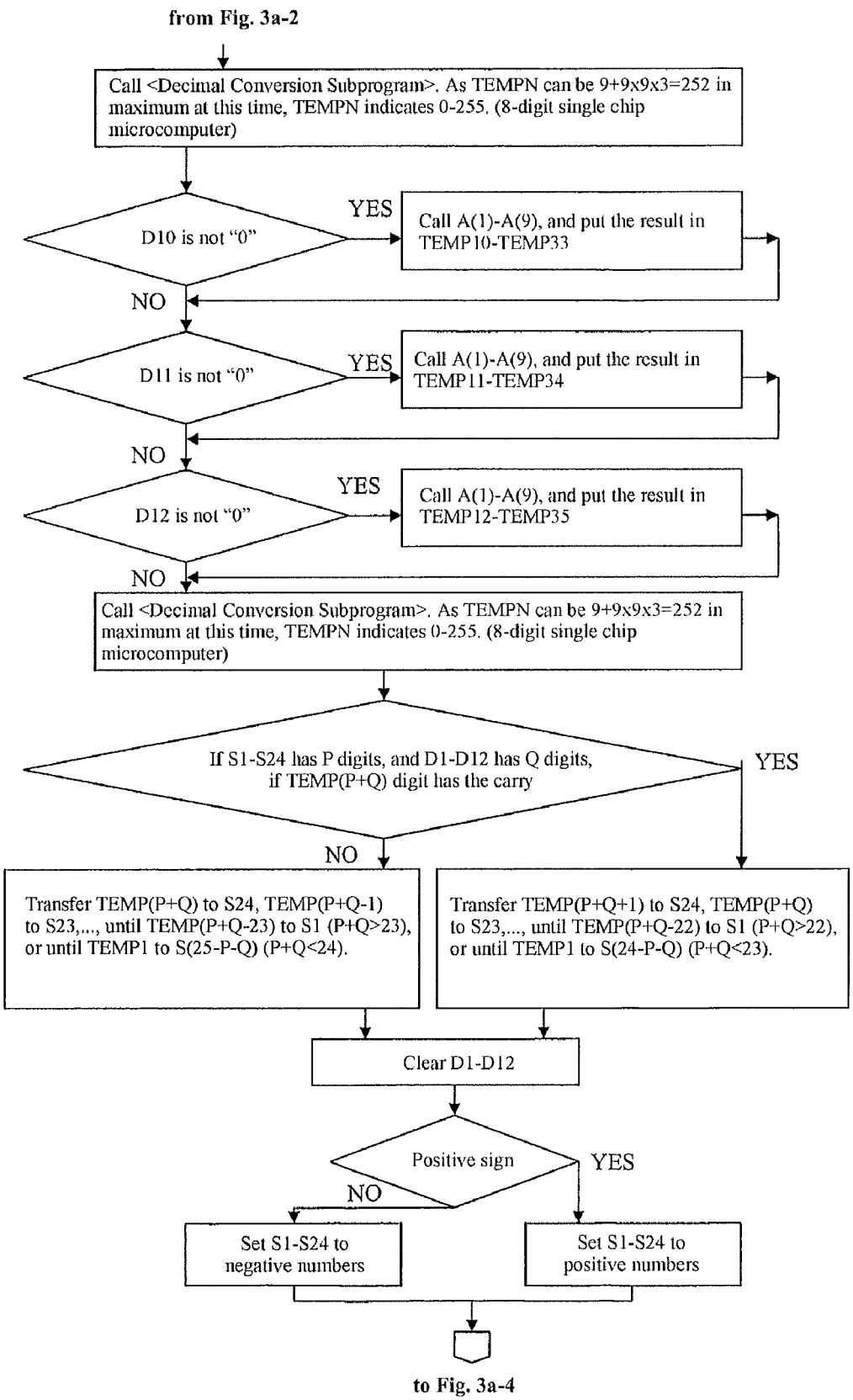
Figures 3, 3A, 4:
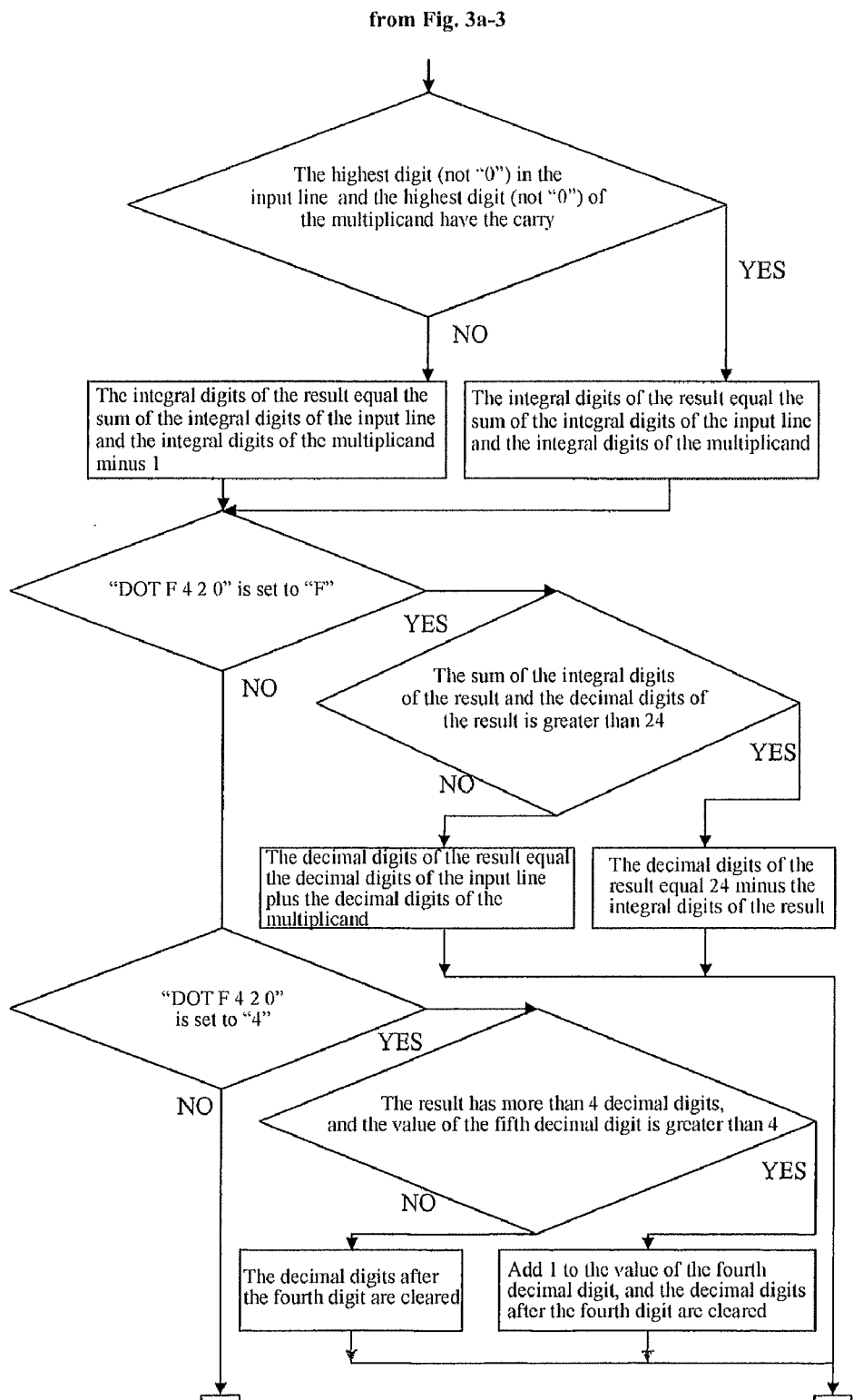
Figures 3, 3A, 4, 5:
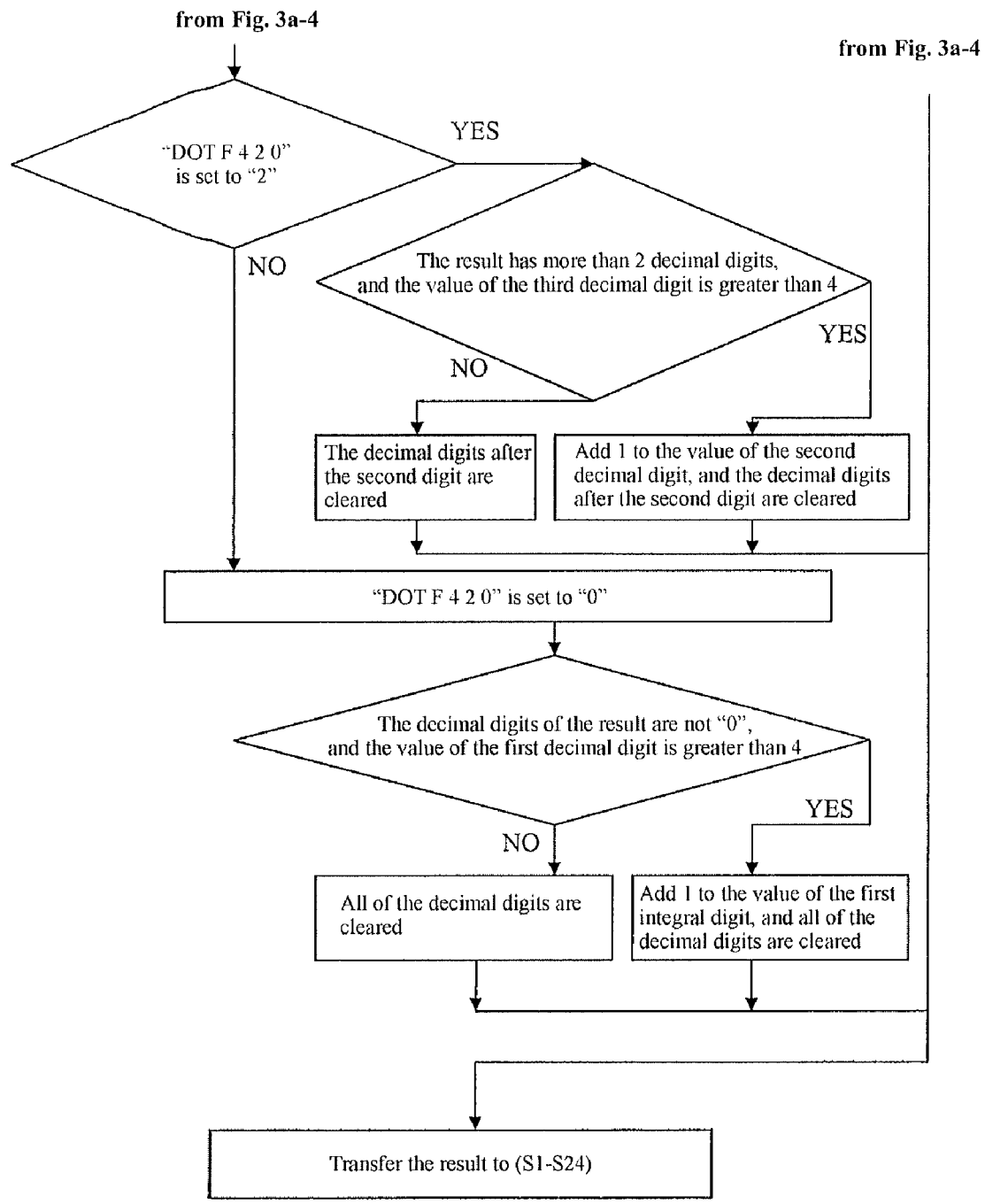
FIG. 5 is a diagram showing the principle of a control circuit of an input apparatus of the present invention.
Figures 1, 3B:
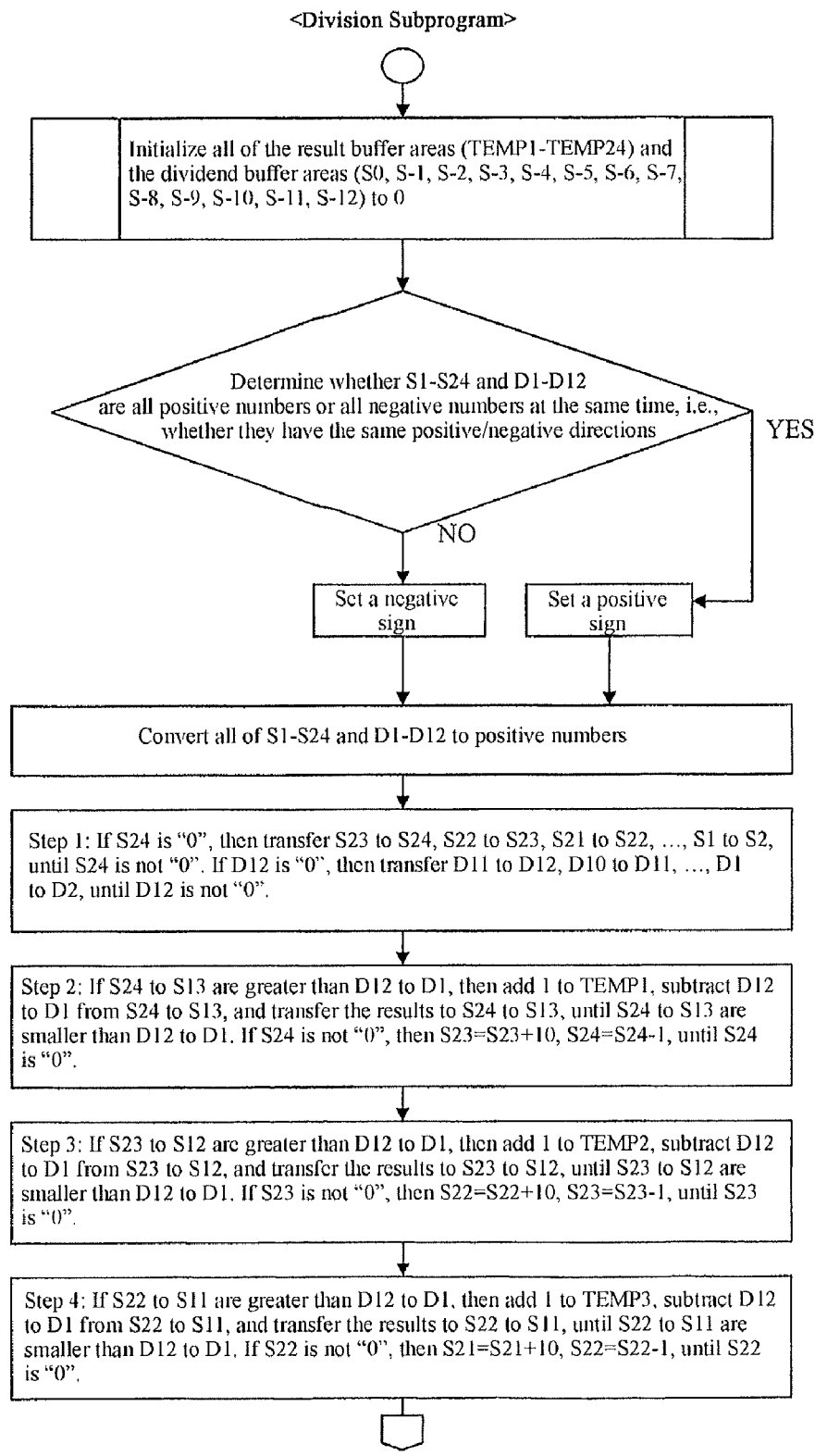
FIG. 3b (sheets -1 through -5) is a flow chart of a division subprogram of the present invention.
Figures 3, 3B:
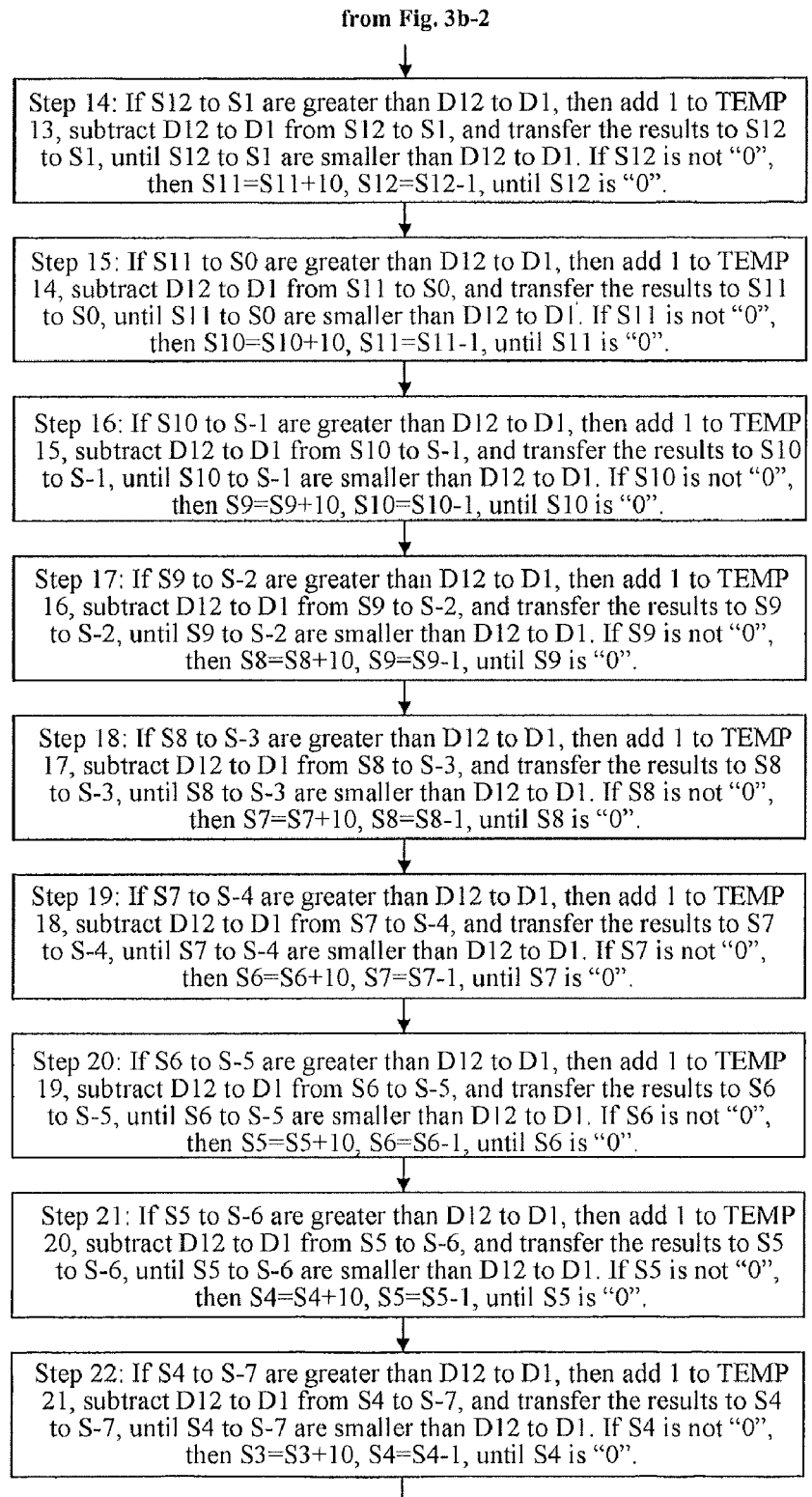
Figures 3, 3B, 4:
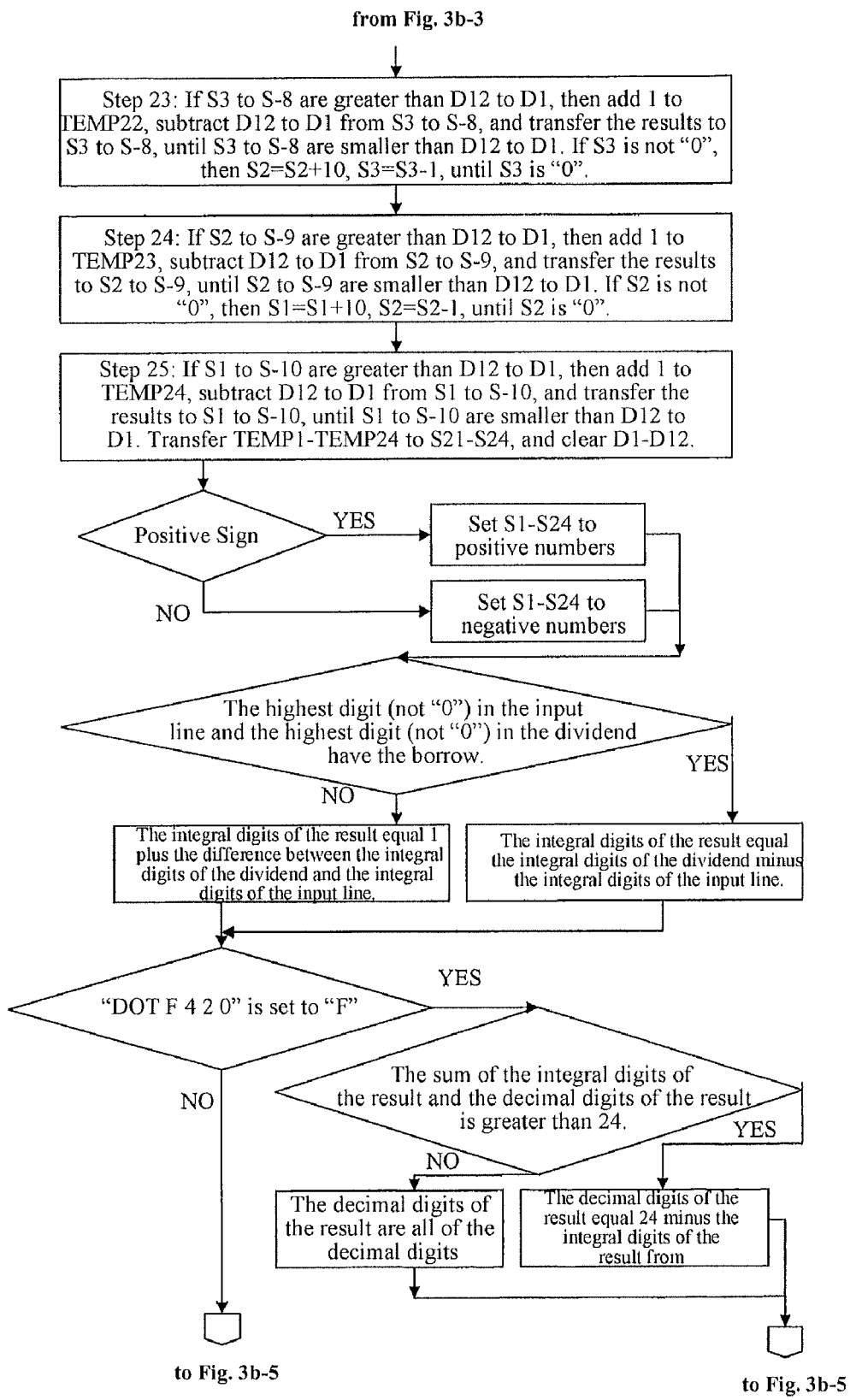
Figures 3, 3B, 4, 5:
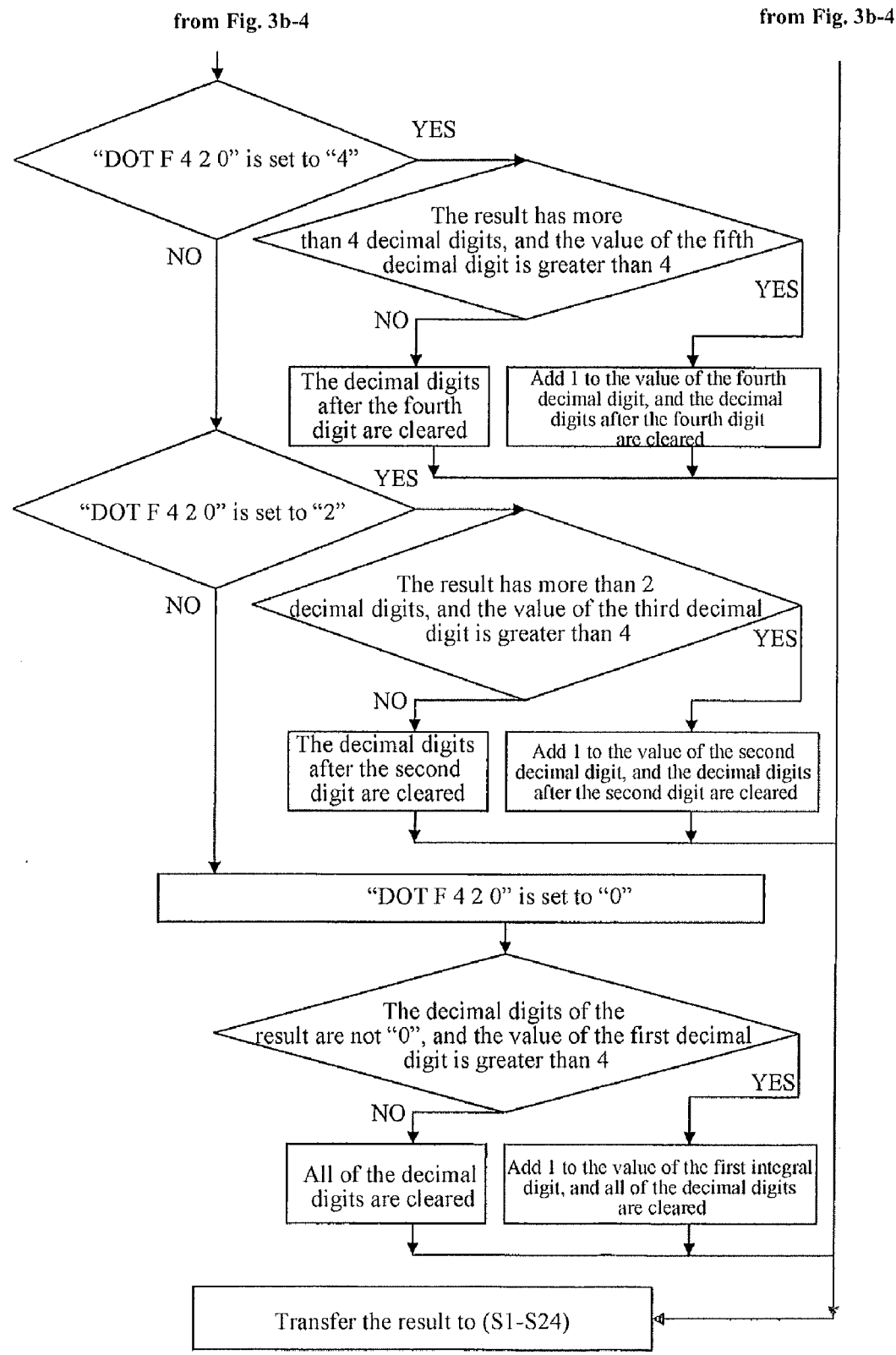
Figures 1, 3C:
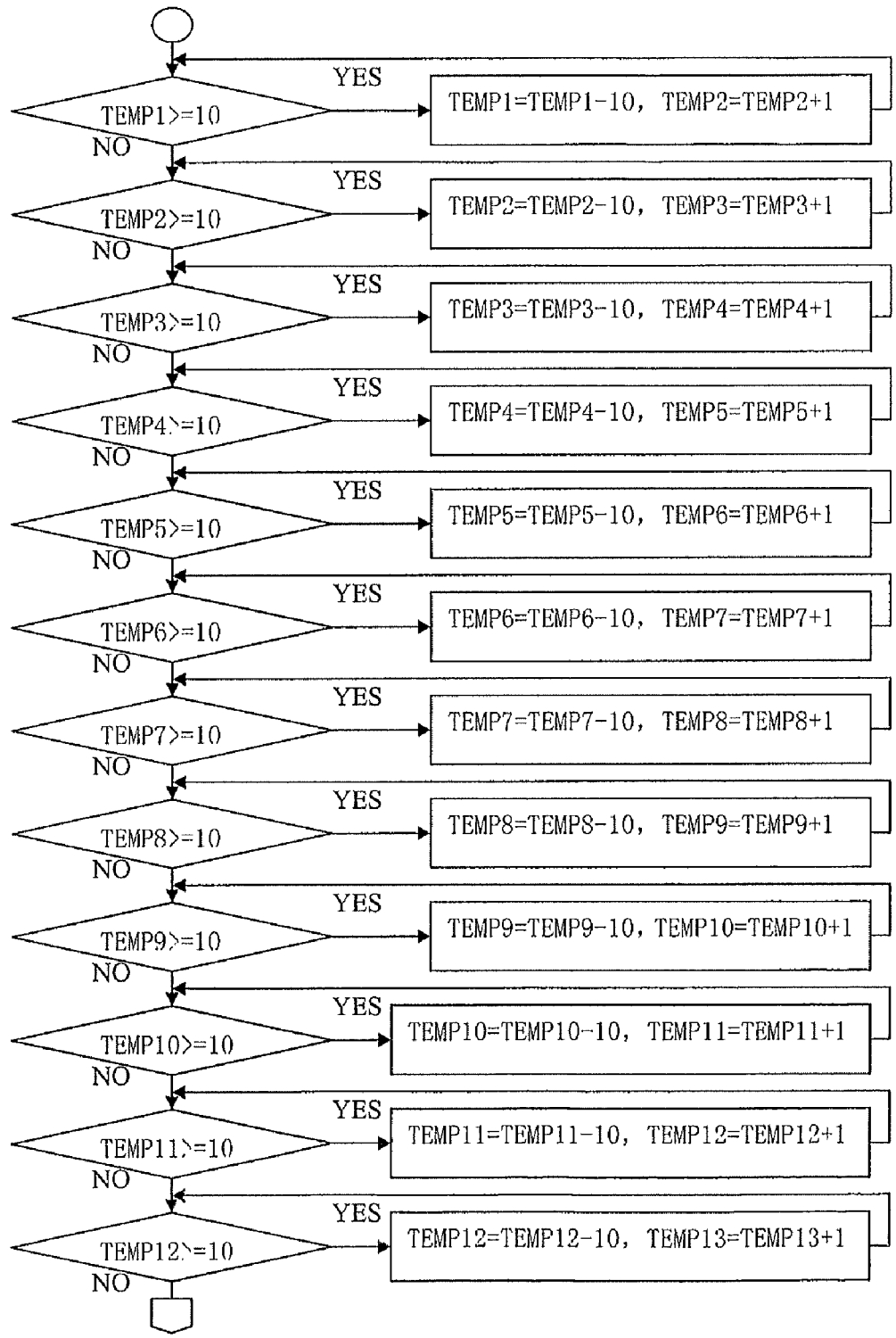
FIG. 3c (sheets -1 through -3) is a flow chart of a decimal conversion subprogram of the present invention.
Figures 2, 3C:
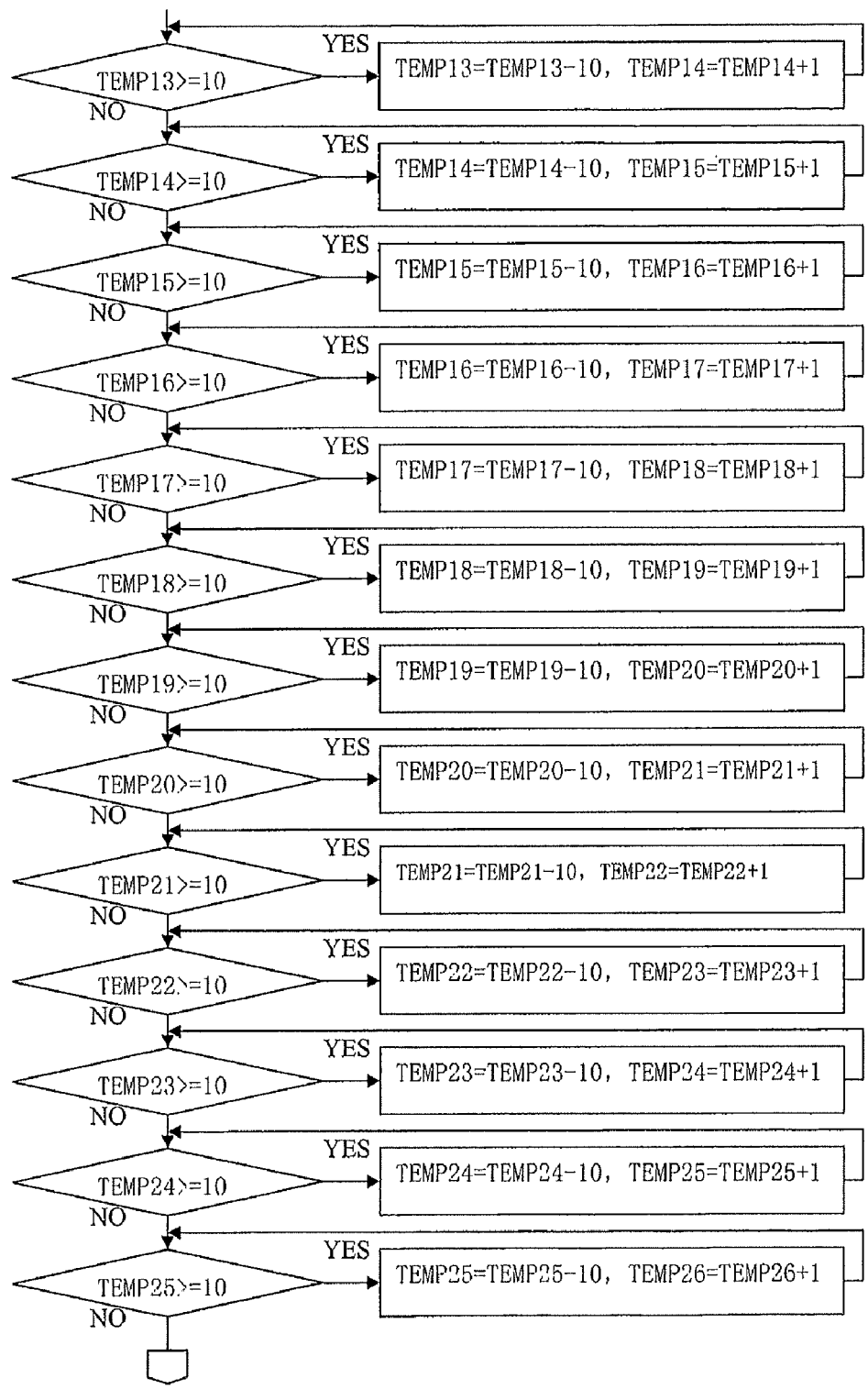
Figures 3, 3C:
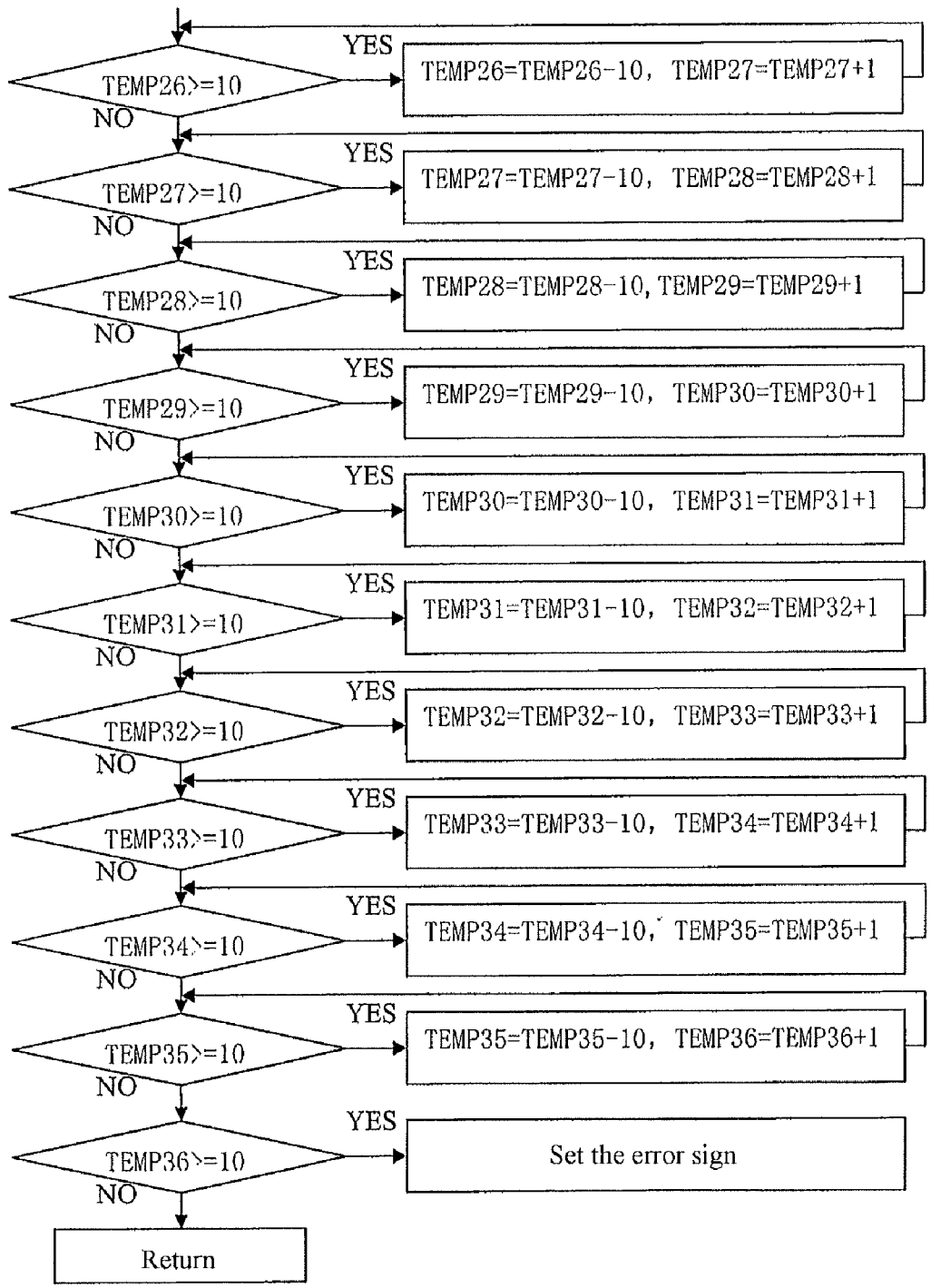
Figure 3D:
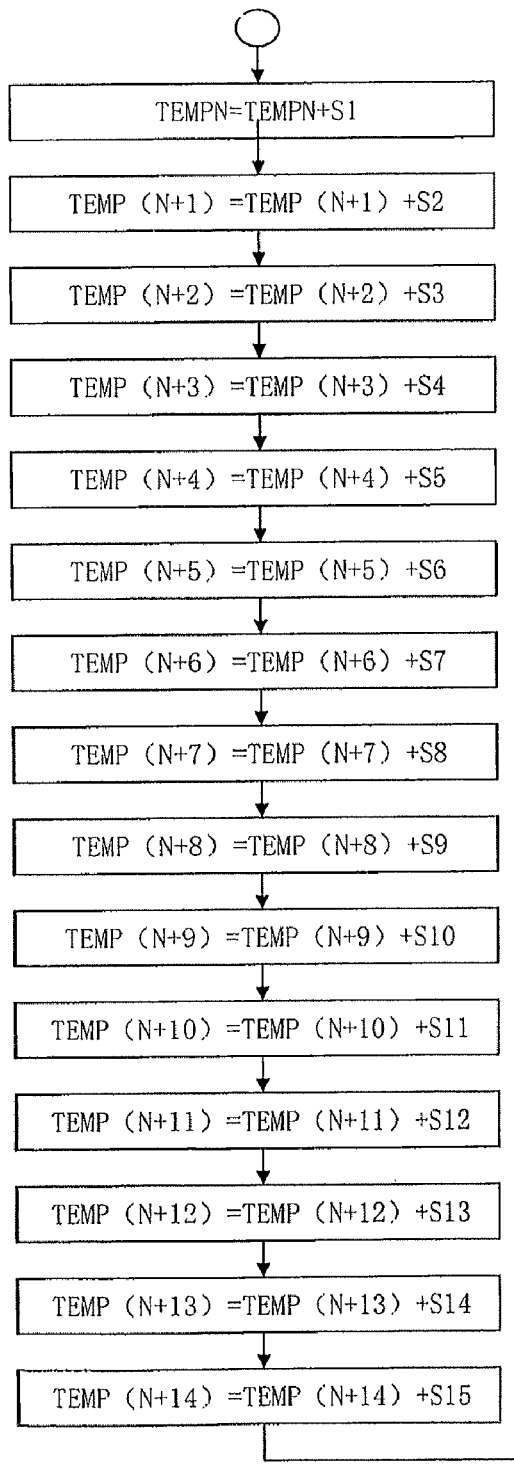
FIG. 3d is a flow chart of a 1x subprogram of the present invention.
Figure 3D:
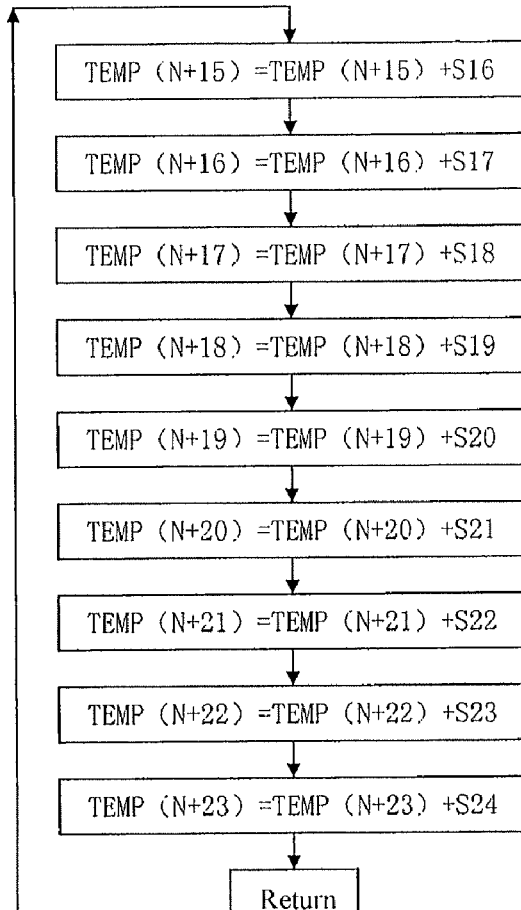
Figure 3E:
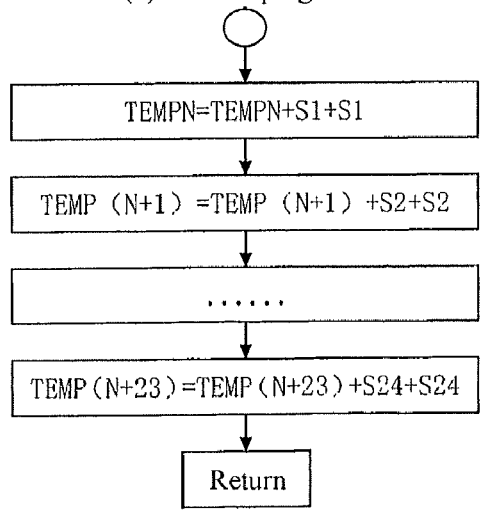
FIG. 3e is a flow chart of a x2 subprogram of the present invention.
Figure 3F:
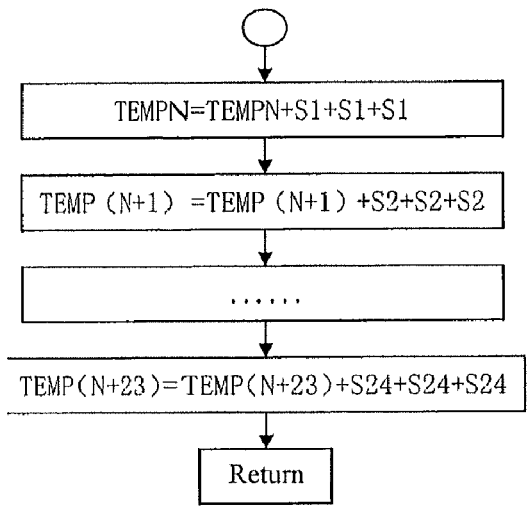
FIG. 3f is a flow chart of a x3 subprogram of the present invention.
Figure 3G:
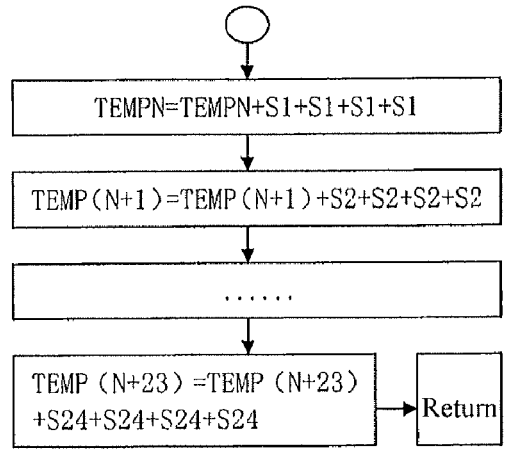
FIG. 3g is a flow chart of a x4 subprogram of the present invention.
Figure 3H:
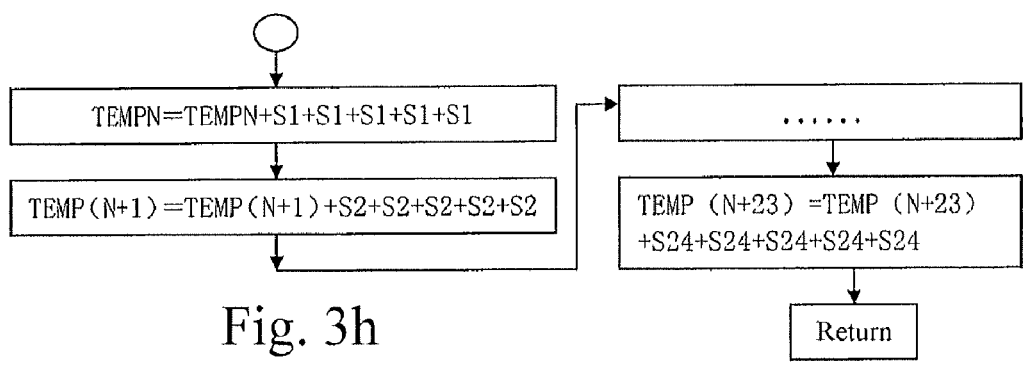
FIG. 3h is a flow chart of a x5 subprogram of the present invention.
Figure 3I:
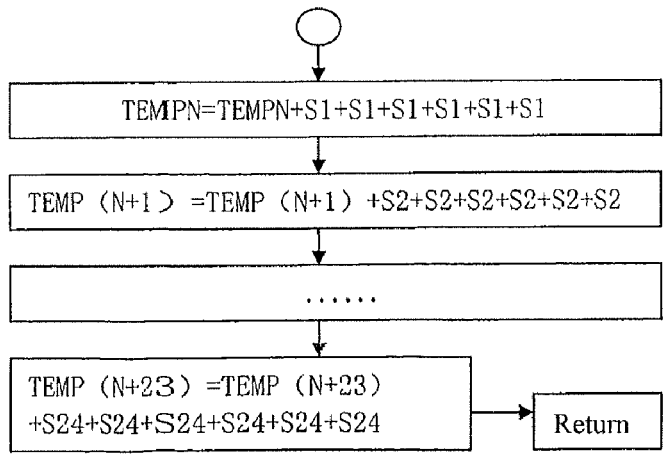
FIG. 3i is a flow chart of a x6 subprogram of the present invention.
Figure 3J:
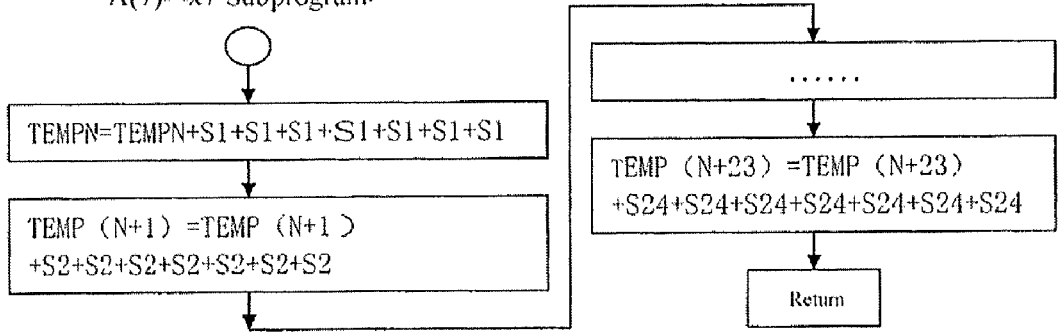
FIG. 3j is a flow chart of a x7 subprogram of the present invention.
Figure 3K:
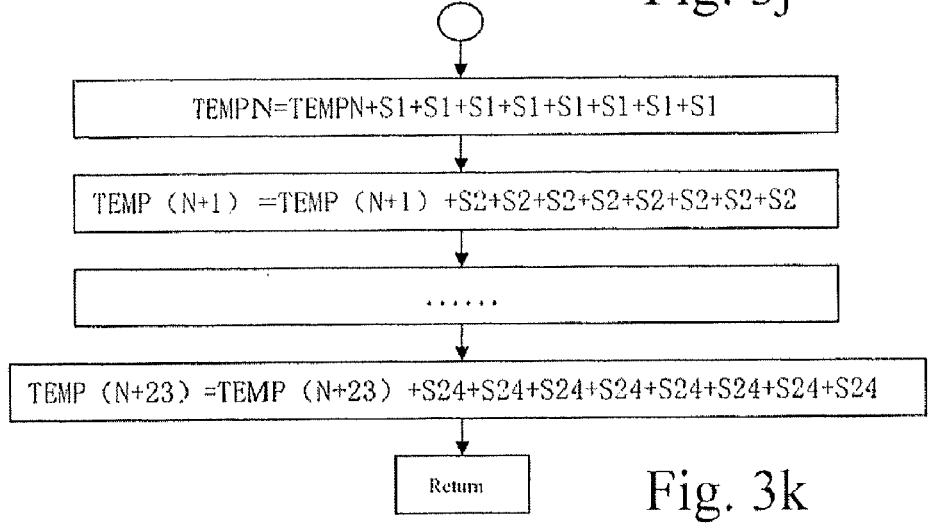
FIG. 3k is a flow chart of a x8 subprogram of the present invention.
Figure 3L:
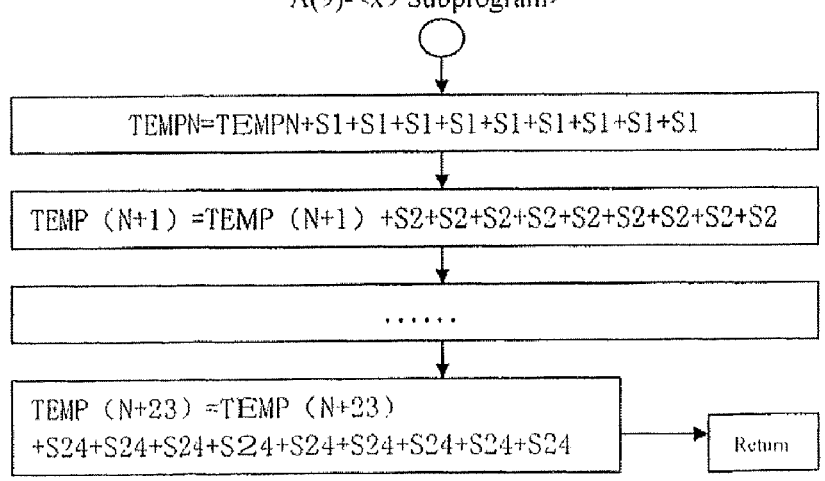
FIG. 3L is a flow chart of a x9 subprogram of the present invention.
Figure 4:
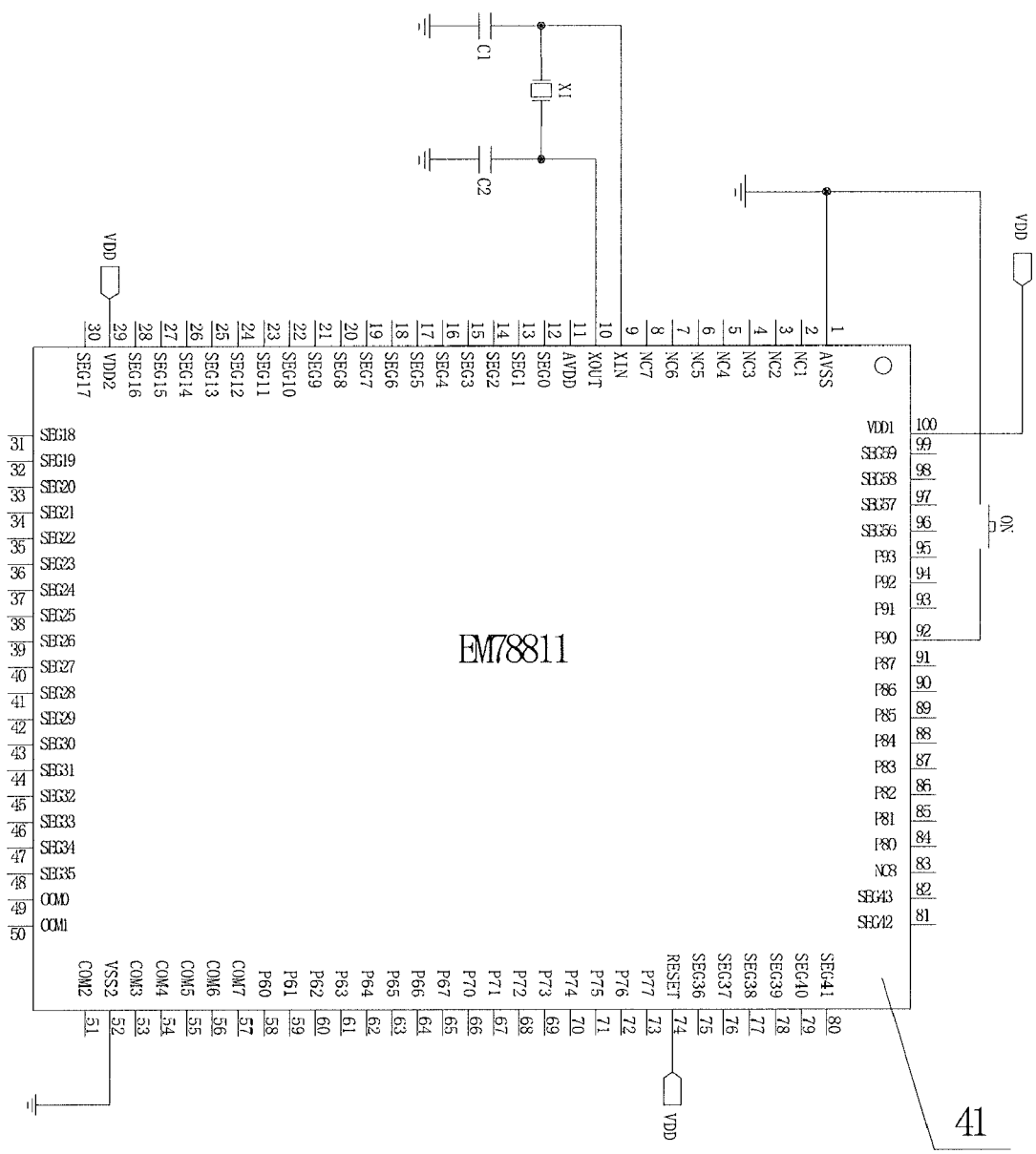
Figure 5:
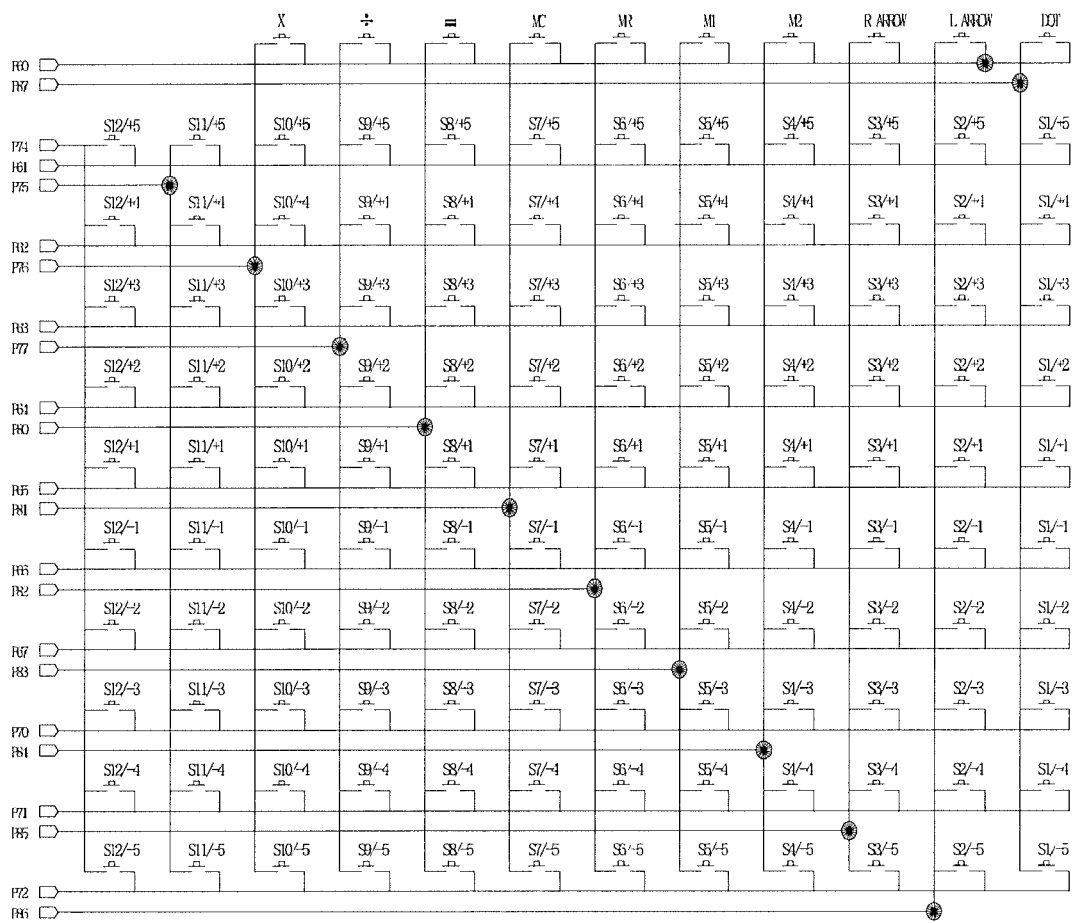
Figure 7A:
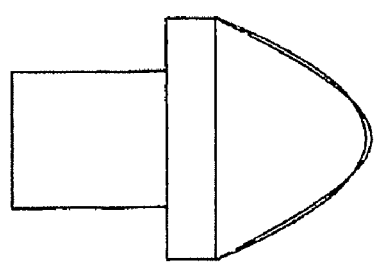
FIG. 7a is a left view of a key of the number input key of the present invention.
Figure 8A:
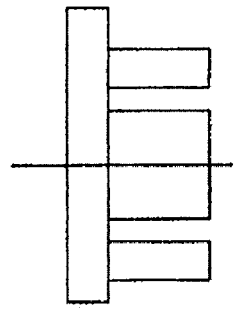
FIG. 8a is a right view of a operating panel of the number input key of the present invention.
Figure 7B:
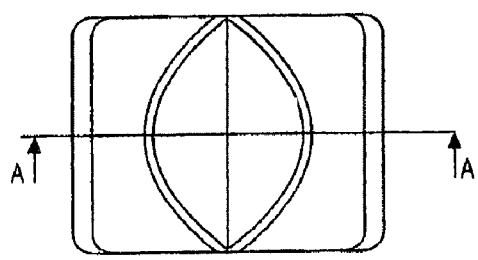
FIG. 7b is a main view of a key of the number input key of the present invention.
Figure 8B:
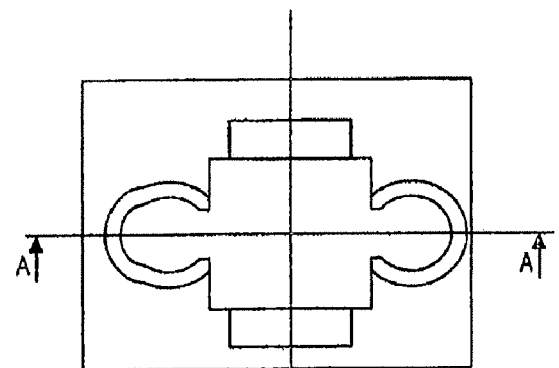
FIG. 8b is a bottom view of the operating panel of the number input key of the present invention.
Figure 7C:
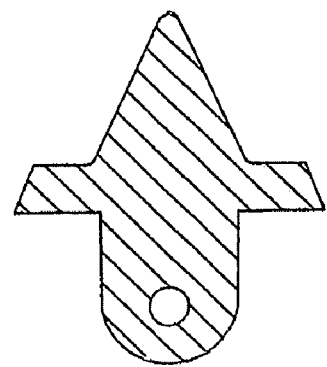
FIG. 7c is a cross-sectional view of a key taken along the line 7c-7c of FIG. 7b of the number input key of the present invention.
Figure 8C:
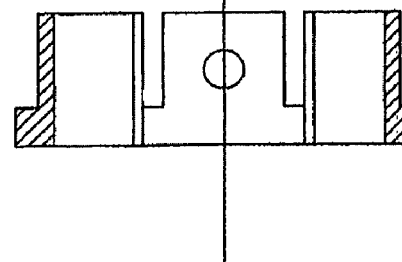
FIG. 8c is a cross-sectional view of the operating panel taken along the line 8c-8c of FIG. 8b of the number input key of the present invention.

FIGS. 2, 4, and 5 are diagrams showing the principles of the circuits of the LCD, the single chip microcomputer (model EM78811 can be used), and the input keys respectively. The single chip microcomputer 41, the LCD display 42, and the input keys are connected via a PCB.

FIG. 3 is a flow chart of the main processes for the implementation of the calculating apparatus of the electronic abacus.

1. 12 digits of the input line are set to be D1, D2, D3, ..., D11, D12, (D1-D12 in short), respectively. 24 digits of the calculation result line are set to be S1, S2, S3, ..., S23, S24 (S1-S24 in short), respectively.

2. Result buffer areas are set to be (TEMP1, TEMP2, TEMP3, ..., TEMP35, TEMP36) (TEMP1-TEMP36 in short), and divident buffer areas are set to be (S0, S-1, S-2, S-3, S-4, S-5, S-6, S-7, S-8, S-9, S-10, S-11, and S-12).

3. D1-D12 and S1-S24, data of each digit is 8-bit binary numbers, and the highest byte of D12 and S24 indicate the input number and the calculation result number are positive or negative.

Switch on the electronic abacus, and press the ON/Clear key ("ON/C" key) 11 to clear the data of input display line and the calculation result line and the "×", "÷" signs 424, 425 and the error sign 427. Reset the input line and the calculation result line to "0", and set the auto power off time of 10 minutes, i.e., this device will be automatically powered off if no operation occurs within 10 minutes since the last operation, and save the last decimal point setting, "DOT F 4 2 0" setting, the data of input line, the data of calculation result line, and the data of M1 and M2 memory keys before the device is powered off.

If the electronic abacus is powered on again after the auto power off, the saved decimal point setting, "DOT F 4 2 0" setting, the data of input line, and the data of calculation result line are called, and displayed in the input display line 421 and the calculation result display line 422.

Press the calculation result decimal digit control key ("DOT F 4 2 0" key) 20. If the input display line and the calculation result line are "0", and the "×" and "÷" signs 424, 425 are not set, the displayed digits of the decimal digits of the calculation result are set, and the operation is invalid for other timings. If "0" is selected, the calculation result display line 422 does not display the decimal digits, and if "F", "4", and "2" are selected, the calculation result display line 422 displays full (23 digits at most), 4, and 2 decimal digits respectively. If the calculation result has more than 3 integral digits, then a 'Thousands' separator ("'" separator sign) 429 is added before every three digits since the third digit of the integral digits.

Press the decimal point left/right floating key ("◀▶" key) 15 to move and locate the decimal point left/right in the input display line 421. Each press of the key moves the decimal point one digit to left/right in the input display line 421. If the input display line and the calculation result line are "0" and the "×" and "÷" signs 424, 425 are not set, the decimal point is moved one digit to left/right in the input display line 421 and the operation is invalid for other timings. The decimal point can be moved cyclically in left/right directions. The column numbers of the number input keys are corresponding to the data of the input display line 421, the integral digits are to the left of the decimal point in the input display line 421, and the decimal digits are to the right of the decimal point in the input display line 421.

Press the multiplication key ("×" key) 13. 1) If the "×" sign 424 and the "÷" sign 425 are not set in advance, clear the data of input display line, set the "×" sign. 2) If the "×" sign 424 has been set in advance and the data of input display line is not "0", call the <Multiplication Subprogram>, i.e., carry out the multiplication is at the same time, and clear the data of input display line. 3) If the "÷" sign 425 has been set in advance and the data of input display line is not "0", call the <Division Subprogram>, i.e., carry out the division at the same time, clear the data of input display line, and clear the "÷" sign 425 and set the "×" sign 424 at the same time. 4) If the "×" sign 424 or the "÷" sign 425 has been set in advance and the data of input display line is "0", the multiplication and division is not performed, and only the "×" sign 424 is set. 5) If the memory signs M1/M2 have been set in advance, the data in the corresponding M1/M2 memory units is used as multiplicands in the calculation. During the above calculation process, if the integral digits in the result are greater than the maximum digits of the calculation result line (24 digits in this embodiment), set the error sign 427 is and exit the process.

Press the division key ("÷" key) 14. 1) If the "×" sign 424 and the "÷" sign 425 are not set in advance and the data of input display line is cleared, set the "÷" sign 425. 2) If the "×" sign 424 has been set in advance and the data of input display line is not "0", call the <Multiplication Subprogram>, i.e., carry out the multiplication at the same time, clear the data of input display line and the "×" sign 424, and set the "÷" sign 425. 3) If the "÷" sign 425 has been set in advance, and the data of input display line is not "0", call the <Division Subprogram>, i.e., carry out the division at the same time and clear the data of input display line. 4) If the "×" sign 424 or the "÷" sign 425 has been set in advance and the data of input display line is "0", the multiplication and division is not performed, and the "×" sign 424 is cleared, and only the "÷" sign 425 is set. 5) If the memory signs M1/M2 have been set in advance, the data in the corresponding M1/M2 memory units is used as dividends in the calculation. In the above calculation process, if the integral digits in the result are greater than the maximum digits of the calculation result line (24 digits in this embodiment), set the error sign ("E" sign) 427 and exit the process.

Press the equal key ("=" key) 12. 1) If the "×" sign 424 has been set in advance, and the data of input display line is not "0", call the <Multiplication Subprogram>, i.e., carry out the multiplication at the same time, and clear the data of input display line and the "×" sign 424. 2) If the "×" sign 424 is set in advance and the data of input display line is "0", clear the calculation result line to "0" and exit, and clear the "×" sign 424. 3) If the "÷" sign 425 has been set in advance and the data of input display line is not "0", call the <Division Subprogram>, i.e., carry out the division at the same time, and clear the data of input display line and the "÷" sign 425. 4) If the "÷" sign 425 has been set in advance and the data of input display line is "0", clear the calculation result line to display the error sign ("E" sign) 427 and exit, and clear the "÷" sign 425. 5) If the "×" sign or the "÷" sign has not been set in advance, clear the data of input display line. 6) If the memory signs M1/M2/M3 have been set in advance, the data in the corresponding M1/M2/MR are transferred to the calculation result line (to participate the addition/subtraction/multiplication/division), and are displayed in the calculation result display line 422, and the memory signs M1/M2/MR and the data in the M1/M2/MR memory units are cleared. During the above calculation process, if the integral digits in the result are greater than the maximum digits of the calculation result line (24 digits in this embodiment), set the error sign ("E" sign) 427 and exit the process.

Press the memory clear key ("MC" key) 18, and clear the data in the first/second memory units and memory signs.

Press the first memory key ("M1" key) 16. 1) If the calculation result line is "0" at this time, the data in the first memory unit is transferred to the calculation result line, and is displayed in the calculation result display line 422, and the corresponding first memory sign (M1 sign) is set at the same time. 2) If the calculation result line is not "0" at this time, the data in the first memory unit is added to the data of the calculation result line, and the sum is stored in the first memory unit. The result is transferred to the calculation result line, and is displayed in the calculation result display line 422. The input display line is cleared to 0, and the first memory sign (M1 sign) is set at the same time. If the memory key ("M1" key) is pressed at this time, the continuous addition/ continuous subtraction is performed, (M1=M1+#"S1-S24"#), where "S1-S24" is a certain fixed data.

Similarly, press the second memory key ("M2" key) 17, the operation process is the same as that of the first memory key ("M1" key).

Press the memory sum key ("MR" key) 19 to add the results of the first memory unit and the second memory unit, the sum is transferred to the calculation result display line 422 for display, and the memory sum mark (MR mark) is set at the same time.

When the number input keys are pressed, the calculating apparatus realizes the following functions. The input of the number input keys is used as the input number which is added to or subtracted from the original number, or has quinary iterative with the original number (adding a positive number to a negative number is equivalent to subtracting a positive number from a positive number; a carry operation in the quinary operation is equivalent to an addition or a subtraction operation). The detailed process is realized as follows.

Press the number input keys ("−5, 5", "1, −1", "2, −2", "3, −3", and "4, −4" keys) 21. 1) If the "×" or "÷" sign has been set in advance, the column number of the number input keys 21 is corresponding to the data of input display line, e.g., the $1^{st}$ column is corresponding to D1, the $n^{th}$ column is corresponding to Dn, which is used as the input number (−5 to +5). If the original number is a positive/negative number, and a positive/negative number is input, the addition is performed on the input display line, and the data of the calculation result line remains unchanged. If the original number is a positive/negative number, and a negative/positive number is input, the subtraction is performed the input display line performs, and the data of the calculation result line remains unchanged. The carry or borrow is still valid. 2) If the "×" or "÷" sign has not been set or the memory sign M1/M2 has been set in advance, the column number of the number input keys is corresponding to the data of the same column of the input display line and the corresponding digit of value of the data of the calculation result line, e.g., the $5^{th}$ column is corresponding to D5, D5 is a number in the hundreds' place, which is corresponding to the number of the hundreds digit in the calculation result line. If the original number is a positive/negative number and a positive/negative number is input, the addition is performed on the calculation result line. If the original number is 5/−5, 1 to 4 or −1 to −4 is input Dn is the original number plus the input number, the input display line displays 6, 7, 8, 9 or −6, −7, −8, −9. If the original number is 1 to 4 or −1 to −4, 5/−5 is input, Dn is the original number plus the input number, and the input display line displays 6, 7, 8, 9 or −6, −7, −8, −9; otherwise, if Dn equals the input number, the input display line displays 1, 2, 3, 4, 5 or −1, −2, −3, −4, −5. 3) If the "×" or "÷" sign has not been set or the memory sign M1/M2 has been set in advance, if the original number is a positive/negative number and a negative/positive number is input, the original positive/negative number in the input display line is cleared, Dn is the input negative/positive number, and the subtraction is performed on the calculation result line. 4) When an integer number is input, the value is $A*10^{(N-1)}$, where A is the value of the number input keys 1, 2, 3, 4, 5, −1, −2, −3, −4, −5, and N stands for the integral digits to the left of the decimal point (e.g., 5 is input in the third digit to the left of the decimal point, then the value is $5*10^{(3-1)}=500$, which means that an integer 500 is input). When a decimal number is input, the value is $A/10^N$, where A is the value of the number input keys 1, 2, 3, 4, 5, −1, −2, −3, −4, −5, and N stands for the decimal digits to the right of the decimal point (e.g., 5 is input in the third digit to the right of the decimal point, then the value is $5/10^3=5/1000=0.005$, which means that a decimal number 0.005 is input). Thus, the displayed decimal and integral digits are determined. When "0" needs to be input, no input operation is required. 5) During the above calculation process, if the input display line has more than 3 integral digits, then a 'Thousands' separator "'" 429 is added before every three digits since the third integral digit.

When the calculation is performed, the decimal point left/right floating key "◀▶" is pressed first to locate the decimal point in the input display line 421, in which the integral digits are to the left of the decimal point, and the decimal digits are to the right of the decimal point. Then the calculation result decimal digit control key "DOT F 4 2 0" is pressed to set the decimal digit display control of the calculation result, when "DOT F 4 2 0" is set to "F", "4", "2", "0", the input display line 421 initially displays "0.", "0.0000", "0.00", and "0." respectively, and the initial data moves with the movement of the location of the decimal point. The column number of the number input keys is corresponding to the data of input display line, the input data before the decimal digit set by the calculation result decimal point display control key "DOT F 4 2 0" is valid, but the input data after the set decimal digit is invalid and is not displayed (e.g., when "DOT F 4 2 0" is set to "4", the input data of the fourth digit to the right of the decimal point in the input display line and the digits to the left of the fourth digit are valid, and the input data of the digits to the right of the fourth digit to the right of the decimal point in the input display line is invalid and is not displayed). When the input display line has more than 3 integral digits, then a 'Thousands' separator "'" 429 is added before every three digits since the third integral digit.

When "DOT F 4 2 0" are set to "F", "4", "2", and "0" respectively, in addition to all integral digits (24 digits at most in this embodiment), the calculation result display line 422 will also display 0 to all decimal digits, 0 to 4 decimal digit, 0 to 2 decimal digits, and no decimal digit respectively (the sum of the integral digits and the decimal digits is 24 at most, and the decimal numbers after 24 digits are cleared and are not displayed). The decimal point is marked between the integral digits and the decimal digits. When the integral digits are more than 3, a 'Thousands' separator "'" 429 is added before every three digits since the third integral digit.

When two or more data are added or subtracted, the mental calculation can be combined in the process, i.e., a user mentally calculates the sum of the data of a same digit of a plurality of data first (from the highest digit to the lowest digit or from the lowest digit to the highest digit). During the mental calculation, no carry or borrow operation is performed. The sum data are then input into this device, so as to realize the rapid addition and subtraction for multiple lines of data at one time.

Referring to Table 1, in the mixed operations of addition, subtraction, multiplication, and division, the calculation can be continuously performed at any order, i.e., the data before the "×", "÷", and "=" keys are pressed can have any times of addition and subtraction to participate calculation as multiplicands/multipliers or dividends/dividers. The data after the "×", "÷", and "=" keys are pressed can participate calculation directly as multiplicands/multipliers or dividends/dividers, and can also participate calculation as multiplicands/multipliers or dividends/dividers after any times of addition and subtraction.

In order to further understand the detailed embodiment of the present invention, a detailed operation process table of various operation processes is shown in Table 1.

TABLE 1

| No. | Operation Keys | Description | 421 Input Display Line | 422 Calculation Result Display Line |
|---|---|---|---|---|
| <1> | "C/ON" | Power On/Clear | 0./0.00/0.0000 | 0./0.00/0.0000 |
| <2> | Auto Power Off | Auto power off if no operation occurs in the last 10 minutes, save the final decimal point setting. "DOT F 4 2 0" setting, 421 input display line, 422 calculation result line, and data in the M1, M2 memory keys, and display them when this device is powered on again. | | |
| <3> | "◀▶" | Decimal point left/right floating key: Each press of the key moves the decimal point a digit to the left/right in the input display line 421. The operation is valid when the input display line 421 and the calculation result line 422 are "0" and the "×", "+" signs 424, 425 are not set, and the operation is invalid for other timings. The decimal point can moved cyclically in left/right directions. | | |
| | | | 0./0.00/0.0000 | = 0./0.00/0.0000 |
| <4> | "DOT F 4 2 0" | Calculation result display control key: control how many decimal digits of the calculation result data are displayed after rounding. The operation is valid when the input display line 421 and the calculation result display line 422 are 0 and the "×", "+" signs 424, 425 are not set, and the operation is invalid for other timings. | | |
| | 1.587612 × 2 = | "DOT F 4 2 0", F is selected | 0. | = 3.175376 |
| | 1.587612 × 2 = | "DOT F 4 2 0", 4 is selected | 0.0000 | = 3.1754 |
| | 1.587612 × 2 = | "DOT F 4 2 0", 2 is selected | 0.00 | = 3.18 |
| | 1.587612 × 2 = | "DOT F 4 2 0", 0 is selected | 0. | = 3. |
| <5> | "1, 2, 3, 4, 5, −1, −2, −3, −4, −5" | (1) Number input keys: 1, 2, 3, 4, 5, −1, −2, −3, −4, and −5 are input with a single key, 6, 7, 8, and 9 are input with two keys, i.e., "5, 1", "5, 2", "5, 3", and "5, 4" of the same digits are input respectively. The input of −6, −7, −8, and −9 are input in the similar way. (2) The input of the data can be from left to right or from right to left, or start from any digit in the data. (3) All "0" in the data will be input automatically. (4) "0" in the controlled range of "DOT F 4 2 0" will also be input automatically. | | |
| | "C/ON" | "DOT F 4 2 0", 2 is selected | 0.00 | = 0.00 |
| | 123789 | | +123,789.00 | = 123,789.00 |
| | "=" | | 0.00 | = 123,789.00 |
| | 789 | | +789.00 | = 124,578.00 |
| | −123789 | | −123,789.00 | = 789.00 |
| | −456 | | −123,456.00 | = 333.00 |
| | 123 | | +123.00 | = 456.00 |
| | −789 | | −789.00 | = −333.00 |
| | −123 | | −123.00 | = −456.00 |
| | 1234 | | +1,234.00 | = 778.00 |
| | 5555 | | +6,789.00 | = 6,333.00 |
| | 5555 | | +5,555.00 | = 11,888.00 |
| | 4321 | | +9,876.00 | = 16,209.00 |
| | 5123 | | +5,123.00 | = 21,332.00 |
| | 1255 | | +6,278.00 | = 22,587.00 |
| <6> | "=" | Equal key: display the calculation results of multiplication and division. | | |
| | 789 | "DOT F 4 2 0", F is selected | +789 | = 789 |
| | "×" | | 0. | × = 789 |
| | 3,487 | | +3,457 | × = 789 |
| | "=" | | 0. | = 2,727.573 |
| | "×" | | 0. | × = 2,727.573 |
| | "=" | | 0. | = 0. |
| | 345 | | +345 | = 345. |
| | "+" | | 0. | ÷ = 345 |
| | "=" | | 0. | = E |
| <7> | "×"/"+" | Multiplication key/Division key: For multiplication/division operation of two numbers. | | |
| | "C/ON" | "DOT F 4 2 0", F is selected | 0. | = 0. |
| | 88.26 | | +88.26 | = 88.26 |
| | "×" | | 0 | × = 88.26 |
| | 1.26 | | +1.26 | × = 88.26 |
| | "=" | | 0. | = 111.2076 |
| | "×" | | 0. | × = 111.2076 |
| | 567 | | +567 | × = 111.2076 |
| | "=" | | 0. | = 63,054.7092 |
| | "+" | | 0. | ÷ = 63,054.7092 |
| | 567 | | +567 | ÷ = 63,054.7092 |
| | "+" | | 0. | ÷ = 111.2076 |
| | "×" | | 0. | × = 111.2076 |
| | 123 | | +123 | × = 111.2076 |
| | "=" | | 0. | = 13,678.5348 |
| <8> | "M1, M2" | Memory keys: (1) When the calculation result line 422 has data, the key is pressed once, the data in the calculation result line is stored in the corresponding memory key M1/M2. If the memory keys are pressed again at this time, the continuous addition/continuous subtraction is performed (M1/M2 = M1/M2 + #"S21-S24"#, where "S21-S24" is a certain fixed data). (2) When the calculation result line 422 has no data the key is pressed once, the data in the corresponding memory key M1/M2 is displayed in the calculation result line 422, and participates any next mixed operations of addition, subtraction, multiplication, and division. | | |
| <9> | "MR" | Memory sum key: display the sum of the data M1 + M2 in the calculation result display line 422. | | |
| <10> | "MC" | Memory clear key: Clear all the data in M1, M2. | | |
| | "C/ON" | "DOT F 4 2 0", 2 is selected | 0.00 | = 0.00 |
| | 400 | | +400.00 | = 400.00 |

TABLE 1-continued

| No. | Operation Keys | Description | 421 Input Display Line | 422 Calculation Result Display Line |
|---|---|---|---|---|
| | "M1" | | 0.00 | M1 = 400.00 |
| | 22 | | +22.00 | = 22.00 |
| | "M1" | | 0.00 | M1 = 422.00 |
| | "M1" | | 0.00 | M1 = 444.00 |
| | "C/ON" | | 0.00 | = 0.00 |
| | "M1" | | 0.00 | M1 = 444.00 |
| | 333 | | +333.00 | = 333.00 |
| | "M2" | | 0.00 | M2 = 333.00 |
| | "=" | | 0.00 | = 333.00 |
| | 123 | | +123.00 | = 456.00 |
| | "M2" | | 0.00 | M2 = 456.00 |
| | "×" | | 0.00 | × M2 = 456.00 |
| | −4 | | +4.00 | × M2 = 456.00 |
| | +6 | | +10.00 | × M2 = 456.00 |
| | −8 | | +2.00 | × M2 = 456.00 |
| | "=" | | 0.00 | = 912.00 |
| | −112 | | −112.00 | = 300.00 |
| | +112 | | +112.00 | = 912.00 |
| | "M2" | | 0.00 | M2 = 912.00 |
| | "MR" | | 0.00 | MR = 1,356.00 |
| | "M1" | | 0.00 | M1 = 444.00 |
| | "M2" | | 0.00 | M2 = 912.00 |
| | "MC" | | 0.00 | = 0.00 |
| | "M1" | | 0.00 | M1 = 0.00 |
| | "M2" | | 0.00 | M2 = 0.00 |
| | "MR" | | 0.00 | MR = 0.00 |
| <11> | Example of mixed operations of addition, subtraction, multiplication, and division | | | |
| | 200 | "DOT F 4 2 0", 2 is selected | +200.00 | = 200.00 |
| | 500 | | +700.00 | = 700.00 |
| | −100 | | −100.00 | = 600.00 |
| | 200 | | +200.00 | = 800.00 |
| | "×" | The data before "×" is pressed is the multiplicand. | 0.00 | × = 800.00 |
| | 200 | | +200. | × = 800.00 |
| | 300 | | +500. | × = 800.00 |
| | −300 | | +200. | × = 800.00 |
| | "=" | The data before "=" is pressed is the multiplier. | 0.00 | = 160,000.00 |
| | 678 | | +678.00 | = 160,678.00 |
| | −678 | | −678.00 | = 160,000.00 |
| | 200 | | +200.00 | = 160,200.00 |
| | −200 | | −200.00 | = 160,000.00 |
| | "÷" | The data before "÷" is pressed is the dividend. | 0.00 | ÷ = 160,000.00 |
| | 200 | | +200.00 | ÷ = 160,000.00 |
| | 100 | | +300.00 | ÷ = 160,000.00 |
| | 100 | | +400.00 | ÷ = 160,000.00 |
| | "=" | The data before "=" is pressed is the divider. | 0.00 | = 400.00 |
| | "×" | | 0.00 | × = 400.00 |
| | 300 | | +300.00 | × = 400.00 |
| | −200 | | +100.00 | × = 400.00 |
| | −95 | | +5.00 | × = 400.00 |
| | "÷" | The data before "÷" is pressed is the multiplier. | 0.00 | ÷ = 2,000.00 |
| | 3 | | +3.00 | ÷ = 2,000.00 |
| | 6 | | +9.00 | ÷ = 2,000.00 |
| | −4 | | +5.00 | ÷ = 2,000.00 |
| | "×" | The data before "×" is pressed is the divider. | 0.00 | × = 400.00 |
| | "C/ON" | | 0.00 | = 0.00 |
| <12> | Example II of the mixed operations of addition, subtraction, multiplication, and division: [(1323 + 456) * 789 − 654 − 182] * 261/(138 − 632) − 182 + 157 * 146 = | | | |
| | "C/ON" | "DOT F 4 2 0", F is selected | 0. | = 0. |
| | 1323 | | +1,323. | = 1,323. |
| | 456 | | +1,476. | = 1,779. |
| | "×" | | 0. | × = 1,779 |
| | 789 | | +789. | × = 1,779 |
| | "=" | | 0. | = 1,403,631. |
| | −654 | | −654. | = 1,402,977. |
| | −182 | | −182. | = 1,402,795. |
| | "×" | | 0. | × = 1,402,795. |
| | 261 | | +261. | × = 1,402,795. |
| | "÷" | | 0. | ÷ = 366,129,495. |
| | 138 | | +138. | ÷ = 366,129,495 |
| | −632 | | −494. | ÷ = 366,129,495 |

TABLE 1-continued

| No. | Operation Keys | Description | 421 Input Display Line | 422 Calculation Result Display Line |
|---|---|---|---|---|
|  | "=" |  | 0. | = −741,152.823886 |
|  | −182 |  | −182. | = −741,334.823886 |
|  | M1 |  | 0. | M1 = −741,334.823886 |
|  | 157 |  | +157. | = 157. |
|  | "×" |  | 0. | × = 157. |
|  | 146 |  | +146. | × = 157. |
|  | "=" |  | 0. | = 22,922. |
|  | M1 |  | 0. | M1 = −718,412.823886 |
| <13> | Operation overflow/ Calculation Error | Display error message | 0./0.00/0.0000 | = E |

The Second Embodiment 2

The difference between this embodiment and the first embodiment is that when the number input keys, the "×" key, the "÷" key, the "=" key, and the operation result memory keys are pressed during the mixed operations of addition, subtraction, multiplication, and division, and the following detailed functions are realized.

"×" key: 1) when the "×" or "÷" sign has not been set, the data in the calculation process is used as the multiplicand, and is stored in the calculation result line, and the "×" sign is set. 2) When the "×" or "÷" sign has been set in advance, no operation is performed or the "×" or "÷" sign is cleared;

"÷" key: 1) when the "×" or "÷" sign has not been set, the data in the calculation process is used as the dividend, and is stored in the calculation result line, and the "÷" sign is set. 2) When the "×" or "÷" sign has been set in advance, no operation is performed or the "×" or "÷" sign is cleared;

"=" key: 1) If the "×" or "÷" sign has been set in advance, the corresponding <Multiplication Subprogram> or <Division Subprogram> is called, i.e., the multiplication or division operation is performed on the input display line (the intermediate operating data or input data) and the calculation result data (the calculation process data); the calculation process data is obtained, and the "×" or "÷" sign is cleared. 2) When the "×" or "÷" sign has not been set in advance, no operation is performed.

Number input keys: 1) if the "×" or "÷" sign has been set, the input of the number input keys is used as the input numbers, the input display line (obtaining the input data or the input numbers) performs the corresponding addition or subtraction (obtaining the intermediate operating data), and the data of the calculation result line remains unchanged. 2) If the "×" or "÷" sign has not been set in advance, the input of the number input keys is used as the input numbers, and the addition or subtraction operation is performed on the calculation result line (the calculation process data and the input numbers).

Operation result memory keys: 1) when the memory key is pressed once, the data of the calculation result line is stored in the operation result memory unit, and the data of the calculation result line is cleared to "0". 2) When the memory key is pressed again, the data stored in the operation result memory unit is added to the data of the calculation result line, and the sum is output to the calculation result line, and meanwhile, the data in the operation result memory unit is cleared to "0".

The above calculation process data refers to the data result before a certain intermediate operator during the operating process of a compound arithmetic formula when the operations are performed sequentially. For example, in the compound arithmetic formula 88.26*12.6*567/567*123=, the operation results 111.2076, 63054.7092, 111.2076, and 13678.5348 are the calculation process data. In the first embodiment, the results are displayed in the calculation result display line. Furthermore, for example, in the compound arithmetic formula [(1323+456)*789−654−182]*261/(138−632)−182+157*146, 1779, 1403631, 1402977, 1402795, 366129495, 741152.823886, 741334.823886, and 764256.823886 are the calculation process data. In the first embodiment, the results are displayed in the calculation result display line.

In the above second embodiment, the calculation process data is stored in the calculation result line. However, in the program setting, when the "×" or "÷" sign has not been set, the calculation process data can be stored in the input display line. When the number input keys are pressed, the addition or subtraction of the input display line is performed. Moreover, when the data of input display line is "0", the data in the operation result memories can also be stored in the input display line. In order to achieve the objectives of the present invention, many software implementation methods can be used, which fall within the protection scope of the present invention.

The Third Embodiment

An operation method of an electronic abacus includes the following steps. An calculating apparatus receives input operating values and operators, so as to perform the corresponding operating process. A display apparatus receives a control signal sent from the calculating apparatus, and displays relevant information. The calculating pparatus receives a value of one digit of an operating value. The value is a positive or negative quinary value, or a value obtained by addition or subtraction of positive or negative quinary numbers, or a value obtained by iterative of positive or negative quinary values.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic abacus, comprising:
an calculating apparatus, an input apparatus, and a display apparatus, the input apparatus and the display apparatus connected with the calculating apparatus, the calculating apparatus processing input information from the input apparatus, and displaying processed input information on the display apparatus, the input apparatus comprising function keys and number input keys, the number input keys comprising a plurality of sets of numeral keys, each set of numeral keys corresponding to one digit of input information displayed on the display apparatus, and each set of the numeral keys comprising keys indicating "5", "–5", "4", "–4", "3", "–3", "2", "–2", "1", and "–1"; and wherein negative numbers are derived from direct input from numeral keys "–5", "–4", "–3", "–2", and "–1", wherein a negative number inputs result in an auto subtraction operation.

2. The electronic abacus as claimed in claim 1, wherein each of the numeral keys combines a shifting means so as to input a positive or a negative number.

3. The electronic abacus as claimed in claim 2, wherein the shifting means in each of the number input keys comprises a key, a shift button and a conductive contact, the key is a bidirectional shift key and comprises a first pressing portion, a second pressing portion, and a shift guide device, the shift guide device confines the moving directions of the first pressing portion and the second pressing portion, and the first pressing portion or the second pressing portion pushes the shift button, and the shift button turns on or off the conductive contact, so as to input data.

4. The electronic abacus as claimed in claim 2, wherein the shift guide device comprises a spindle and a rotator, the rotator defines a spindle hole for the spindle to pass through, the first pressing portion and the second pressing portion are fixed on the rotator, and are substantially symmetrically disposed on two sides of the spindle.

5. The electronic abacus as claimed in claim 4, wherein the key further comprises a head, a rotator is fixed on the head, a spindle passes through a spindle hole of the rotator and is supported on an input keyboard operating panel, shift buttons comprise a first and a second conductive rubber buttons, one end of the first and the second conductive rubber buttons is supported on surfaces of a first pressing portion and a second pressing portion respectively, and the other end of the first and the second conductive rubber buttons is pressed on the conductive contact, so as to turn on or turn off the conductive contact.

6. The electronic abacus as claimed in claim 5, wherein each set of the numeral keys comprises 5 keys, and forms a column of number input keys, each column is a "–5, 5" key, a "1, –1" key, a "2, –2" key, a "3, –3" key, and a "4, –4" key respectively or a "–5, 5" key, a "1, –4" key, a "2, –3" key, a "3, –2" key, and a "4, –1" key respectively from top to bottom or from bottom to top.

7. The electronic abacus as claimed in claim 2, wherein operating the number input keys, the calculating apparatus realizes the functions of using an input of the number input key as an input number, and acquiring input data or performing addition, subtraction, or quinary iterative operation the input number on the input number.

8. The electronic abacus as claimed in claim 7, wherein the function keys further comprise a "×" key, a "÷" key, an "=" key, and operation result memory keys, when the function keys or the number input keys are pressed, the calculating apparatus realizes the following functions respectively:

the multiplication key: 1) when a "×" or "÷" sign has not been set, calculation process data is used as a multiplicand, and the "×" sign is set;

the "÷" key: 1) when the "×" or "÷" sign has not been set, the calculation process data is used as a dividend, and the "÷" sign is set;

the "=" key: 1) if the "×" or "÷" sign has been set in advance, a corresponding <Multiplication Subprogram> or a <Division Subprogram> is called, i.e., at this time, multiplication or division is performed on the intermediate operating data or the input data and the calculation process data; the calculation process data is obtained, and the "×" or "÷" sign is cleared;

the number input keys: 1) if the "×" or "÷" sign has been set in advance, then the input of the number input keys is used as the input numbers, an input display line obtains the input data or corresponding addition or subtraction is performed on the input numbers to obtain the intermediate operating data, and data of a calculation result line remains unchanged; 2) if the "×" or "÷" sign has not been set, the input of the number input keys is used as the input numbers, and the addition or subtraction operation is performed on the calculation process data of the calculation result line and the input numbers;

the operation result memory keys: storing or outputting the data of the calculation result line.

9. The electronic abacus as claimed in claim 8, wherein operating the function keys of the "×" key and the "÷" key, the calculating apparatus further realizes the following functions:

the "×" key: 2) when the "×" or "÷" sign has been set and meanwhile the data of input display line is not "0", transfer to the corresponding <Multiplication Subprogram> or <Division Subprogram>, i.e., the corresponding multiplication or division operation is performed on the intermediate operating data or the input data and the calculation process data; the calculation process data is obtained, and the "×" sign is set;

the "÷" key: 2) when the "×" or "÷" sign has been set and meanwhile the data of input display line is not "0", transfer to the corresponding <Multiplication Subprogram> or <Division Subprogram>, i.e., the corresponding multiplication or division operation is performed on the intermediate operating data or the input data and the calculation process data; the calculation process data is obtained, and the "÷" sign is set.

10. The electronic abacus as claimed in claim 9, wherein the intermediate operating data or input data is stored in the input display line, and the process data is stored in the calculation result line, when the function keys or the number input keys are pressed, the calculating apparatus further realizes the following functions:

the "×" key: if the "×" sign or the "÷" key has not been set in advance or the "×" sign or the "÷" has been set in advance, and meanwhile the data of input display line is not "0", the data of input display line is cleared, and the "×" sign is set; 3) if the "×" sign or the "÷" sign has been set in advance and meanwhile the data of input display line is "0", the multiplication or division operation is not performed, and only the "×" sign is set; 4) if the memory sign has been set in advance, data in a memory unit of the corresponding operation result is used as the multiplicand to participate calculation; 5) during the above calculation process, if integral digits of the result are more than a maximum digits of the calculation result line, an error sign is set and exit the process;

the "÷" key: if the "×" sign or the "÷" key has not been set in advance, or the "×" sign or the "÷" sign has been set in advance, and meanwhile the data of input display line is not "0", the data of input display line is cleared, and the "÷" sign is set; 3) if the "×" sign or the "÷" sign has been set in advance and meanwhile the data of input display line is "0", the multiplication or division operation is not performed, and only the "÷" sign is set; 4) if the memory sign has been set in advance, the data in the corresponding operation result memory unit key is used as the dividend to participate calculation; 5) during the above calculation process, if the integral digits of the result are more than the maximum digits of the calculation result line, the error sign is set and exit the process;

the "=" key: 2) if the "×" sign or the "÷" sign has not been set in advance, the data of input display line is cleared; 3) if the memory sign has been set in advance, the data in the corresponding operation result memory is transferred to the calculation result line, and the memory sign and the data in the corresponding operation result memory unit are cleared;

the number input keys: 3) if the "×" or "÷" sign has not been set in advance, and the previous input number and the latter input number of the input display line have the same positive or negative number, the corresponding quinary iterative operation is performed on the input display line; 4) if the "×" or "÷" sign has not been set in advance, and the previous input number and the latter input number of the input display line have different positive or negative numbers, the previous input number in the input display line is cleared, and the corresponding digit of the input display line is equal to the latter input number;

the operation result memory keys: 1) if the calculation result line is "0" at this time, the data of the operation result memory units is transferred to the calculation result line, and the corresponding memory sign is set at the same time; 2) if the calculation result line is not "0", the data of the operation result memory units is added to the data of the calculation result line and stored in the operation result memory units, and the result is transferred to the calculation result line, the data of input display line is cleared, and the corresponding memory sign is set.

11. The electronic abacus as claimed in claim 1, wherein the display apparatus comprises an input display line and a calculation result display line, the input display line displays the input data of the input display line, and the calculation result display line displays the operating process data of the calculation result line.

12. The electronic abacus as claimed in claim 11, wherein the input display line comprises data display digits, and further comprises a part or all of a positive/negative sign display digit beside each digit of the data, a 'Thousands' separator display digit, and a decimal point display digit; the calculation result display line comprises data display digits, and further comprises a part or all of a calculation result overflow or error display digit, a memory state display digit, a "×" sign display digit, a "÷" sign display digit, an "=" sign display digit, a 'Thousands' separator display digit beside each digit of data, and a decimal point display digit.

13. The electronic abacus as claimed in claim 1, wherein the function keys further comprise a decimal digit control key or a decimal point left/right floating key, the decimal digit control key controls decimal digits of the data of the calculation result line, and the decimal point left/right floating key moves a position of a decimal point in the data of input display line cyclically in left and right directions.

14. The electronic abacus as claimed in claim 1, wherein the input apparatus further comprises an ON/Clear key, when the ON/Clear key is pressed, the calculating apparatus is powered on, and the input operating value is cleared to "0", when an integral number is input, the value is expressed by $A*10^{(N-1)}$, where A is a value of the number input key, and N stands for integral digits to the left of the decimal point, when a decimal number is input, the value is expressed as $A/10^N$, where A is the value of the number input key, and N stands for decimal digits to the right of the decimal point, and the display apparatus only displays the integral values after a highest digit that is not "0" and the decimal values before a lowest digit that is not "0".

15. An operation method of an electronic abacus, comprising the following steps: a calculating apparatus receiving input information of operating values and operators from an input apparatus to perform a corresponding operating process, a display apparatus displaying the input information and calculation result under control of the calculating apparatus, the calculating apparatus respectively receiving value for one digit of the operating value, and the value being a positive or negative quinary value, or a value obtained by addition or subtraction of positive or negative quinary numbers, or a value obtained by iterative operation of positive or negative quinary values.

* * * * *